(12) United States Patent
Nomura et al.

(10) Patent No.: US 6,963,455 B2
(45) Date of Patent: Nov. 8, 2005

(54) LENS BARREL

(75) Inventors: Hiroshi Nomura, Saitama (JP);
Yoshihiro Yamazaki, Saitama (JP);
Isao Okuda, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/771,402

(22) Filed: Feb. 5, 2004

(65) Prior Publication Data

US 2004/0156122 A1    Aug. 12, 2004

(30) Foreign Application Priority Data

Feb. 5, 2003    (JP) .............................. 2003-028664

(51) Int. Cl.[7] .......................... G02B 15/14; G03B 17/00
(52) U.S. Cl. ...................... 359/694; 359/699; 359/700; 359/701; 359/819; 396/72; 396/79; 396/85; 396/87; 396/448
(58) Field of Search ................................ 359/694, 696, 359/699, 700, 701, 703, 704, 819, 823; 396/72, 396/79, 85, 87, 349, 448, 80, 106

(56) References Cited

U.S. PATENT DOCUMENTS

| 5,144,493 | A | * | 9/1992 | Nomura | 359/700 |
|---|---|---|---|---|---|
| 5,164,757 | A | * | 11/1992 | Nomura | 396/80 |
| 5,488,513 | A | | 1/1996 | Tanaka | 359/699 |
| 5,589,987 | A | | 12/1996 | Tanaka | 359/701 |
| 5,640,615 | A | * | 6/1997 | Nomura et al. | 396/72 |
| 5,815,744 | A | * | 9/1998 | Ohmiya | 396/72 |
| 5,940,226 | A | * | 8/1999 | Tanaka | 359/819 |
| 6,520,691 | B2 | | 2/2003 | Nomura et al. | 396/448 |
| 6,819,502 | B2 | * | 11/2004 | Nomura et al. | 359/701 |

FOREIGN PATENT DOCUMENTS

| JP | 11-044835 | 2/1999 |
|---|---|---|
| JP | 2001-215562 | 8/2001 |

* cited by examiner

*Primary Examiner*—Loha Ben
(74) *Attorney, Agent, or Firm*—Greenblum & Bernstein, P.L.C.

(57) ABSTRACT

A lens barrel includes a holder holding an image pick-up device; a stationary barrel having a female helicoid; a gear/helicoid ring including an annular rib, a male helicoid formed on the annular rib and engaged with the female helicoid, and a spur gear formed on the male helicoid; a pinion engaged with the spur gear; a linear guide ring provided around the gear/helicoid ring; a outer circumferential groove formed on the gear/helicoid ring; and bayonet lugs projecting rearwards from the linear guide ring and engaging in the circumferential groove. Rotation of the gear/helicoid ring causes a lens group to move along the optical axis. At least a portion of a rear end of the male helicoid extends rearwards. At least a portion of the rear extension portion overlaps the holder in the optical axis direction when the gear/helicoid ring stops retracting at a predetermined position.

16 Claims, 22 Drawing Sheets

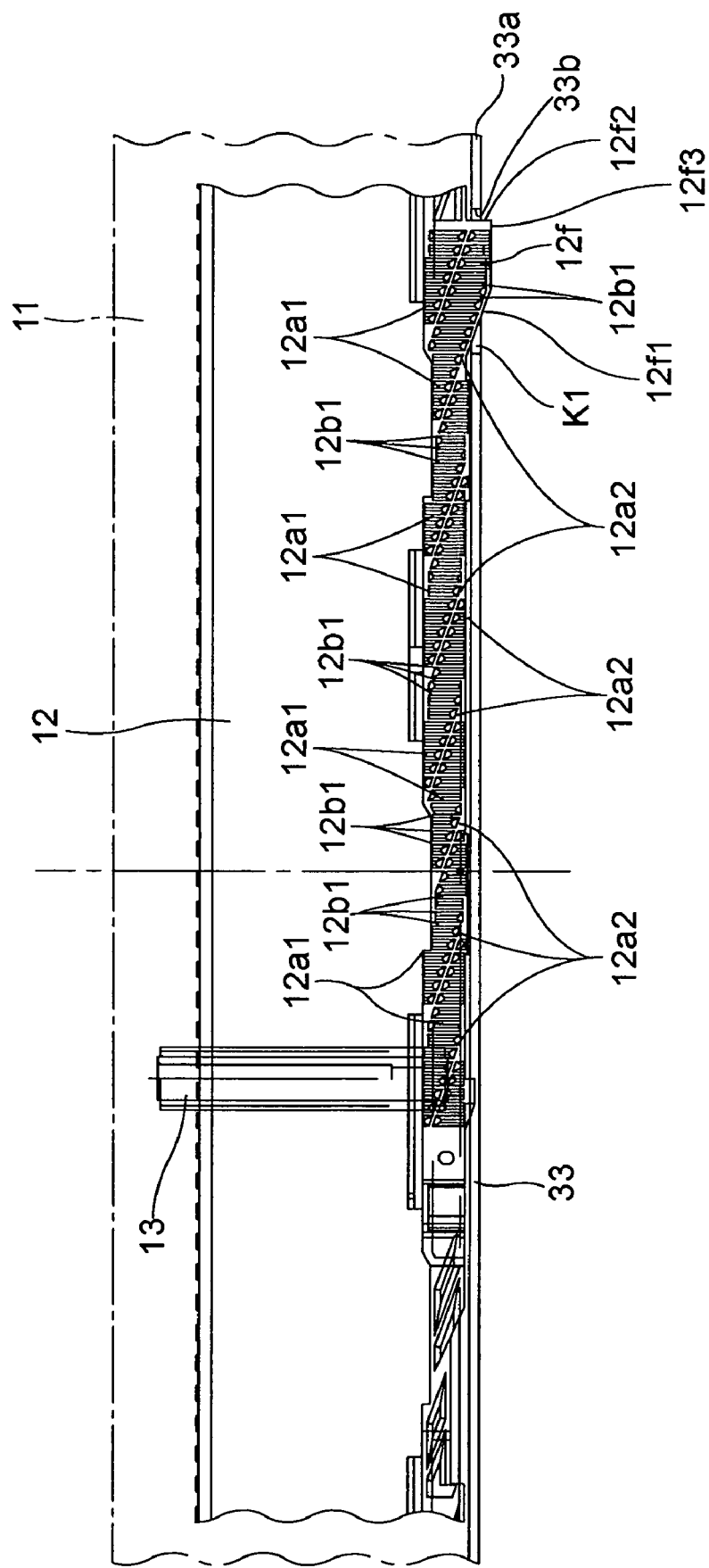

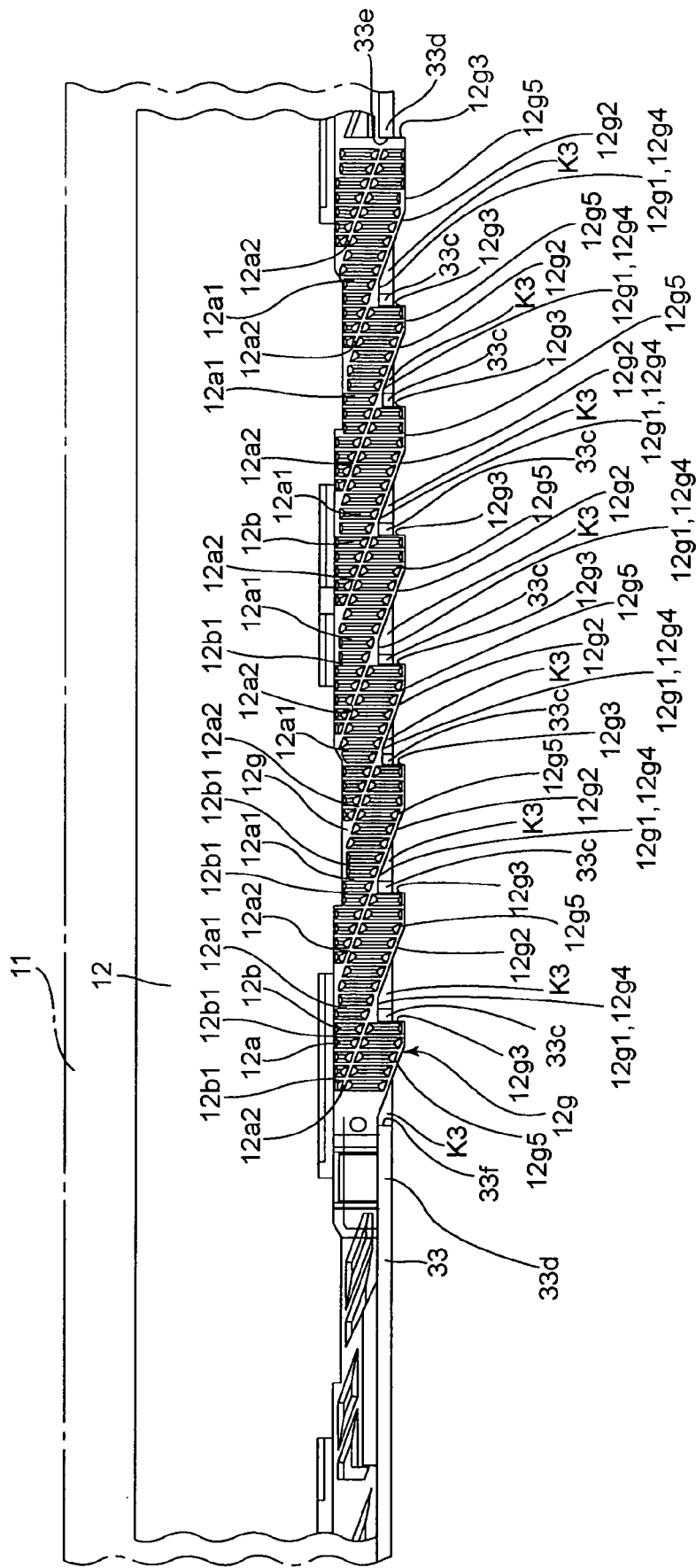

LENS BARREL

BACKGROUND OF THE INVENTION

1. Field of the Invention

The present invention relates to a lens barrel.

2. Description of the Related Art

Small-sized lens barrels which incorporate a lens drive mechanism including a stationary barrel, a gear/helicoid ring and a drive pinion, wherein a male helicoid formed on a gear/helicoid rib (annular rib) projecting radially outwards from a rear end of the gear/helicoid ring is engaged with a female helicoid formed on an inner peripheral surface of the stationary barrel and wherein the drive pinion that rotates at a fixed position is engaged with a spur gear formed on the thread of the male helicoid of the gear/helicoid ring, are known in the art. A linear guide ring which is linearly guided along an optical axis is disposed around the gear/helicoid. The gear/helicoid ring is provided immediately in front of the gear/helicoid rib with a plurality of bayonet lugs, while the linear guide ring is provided on an inner peripheral surface thereof with a circumferential groove in which the plurality of bayonet lugs of the gear/helicoid ring are engaged so that the gear/helicoid ring and the linear guide ring move together in the optical axis direction while allowing the gear/helicoid ring to rotate freely relative to the linear guide ring. Rotation of the gear/helicoid ring by rotation of the drive pinion causes one or more focal-length varying lens groups, which are linearly guided along the optical axis via the linear guide ring, to move along the optical axis to perform a zooming operation.

In such lens barrels, the axial length of the gear/helicoid rib is to be as short as possible to reduce the length of the lens barrel to the extreme. However, if the axial length of the gear/helicoid rib is excessively short, a sufficient length of engagement between the spur gear of the gear/helicoid ring and the drive pinion in the optical axis direction cannot be secured, which makes it impossible to perform a lens driving operation with stability.

SUMMARY OF THE INVENTION

The present invention provides a lens barrel which incorporates the aforementioned type of lens drive mechanism including a stationary barrel, a gear/helicoid ring and a drive pinion, wherein the lens drive mechanism has a structure making it possible to miniaturize the zoom lens barrel, specifically to achieve both a further reduction in axial length of the gear/helicoid ring and a stable lens driving operation.

According to an aspect of the present invention, a lens barrel is provided, including a holder which holds an image pick-up device; a stationary barrel which includes a female helicoid formed on an inner peripheral surface thereof; a gear/helicoid ring which includes an annular rib formed on outer peripheral surface of the gear/helicoid ring at a rear end thereof, a male helicoid formed on the annular rib and engaged with the female helicoid of the stationary barrel, and a spur gear, wherein teeth of the spur gear are formed on each thread of the male helicoid; and a driving pinion which is engaged with the spur gear. A rotation of the gear/helicoid ring via rotation of the pinion causes the lens group to move along the optical axis. At least a portion of a rear end of the male helicoid, on threads of which the teeth of the spur gear are formed, extends rearwards to serve as a rear extension portion. At least a portion of the rear extension portion overlaps the holder in the optical axis direction when the gear/helicoid ring firstly retracts while rotating, and subsequently stops retracting at a predetermined position.

It is desirable for one of opposite end surfaces of the rear extension portion in a circumferential direction of the gear/helicoid ring to extend obliquely rearwards on an extension of a root between two adjacent threads of the male helicoid, and for the other of the opposite end surfaces of the rear extension portion to extend parallel to the teeth of the spur gear.

It is desirable for a cutout portion to be formed on the holder so that a surface of the rear extension portion comes into contact with one of opposite edges of the cut out portion of the holder in a circumferential direction of the holder in the case where the gear/helicoid ring accidentally retracts beyond the predetermined position.

The lens barrel can include a moving ring which supports the lens group and includes at least one cam follower, wherein at least one cam groove in which the cam follower is engaged is formed on the gear/helicoid ring.

It is desirable for the holder to be fixed to a rear end surface of the stationary barrel.

It is desirable for the pinion to be elongated in a direction parallel to the optical axis.

It is desirable for the moving ring to be linearly guided along the optical axis without rotating.

It is desirable for the lens barrel to be a zoom lens barrel, and for the lens group to be a focal length varying lens group.

The lens barrel can include a linear guide ring provided around said gear/helicoid ring, and linearly guided along an optical axis without rotating, said linear guide ring guiding at least one lens group along said optical axis; a circumferential groove which is formed on an outer peripheral surface of said gear/helicoid ring adjacent to and in front of said annular rib; and a plurality of bayonet lugs which project from a rear end of said linear guide ring to be engaged in said circumferential groove so that said gear/helicoid ring and said linear guide ring move together in said optical axis direction while allowing said gear/helicoid ring to rotate freely relative to said linear guide ring.

In another embodiment, a lens barrel is provided, including a stationary barrel which includes a female helicoid formed on an inner peripheral surface thereof; a gear/helicoid ring which includes an annular rib formed on outer peripheral surface of the gear/helicoid ring at a rear end thereof, a male helicoid formed on the annular rib and engaged with the female helicoid of the stationary barrel, and a spur gear, wherein teeth of the spur gear are formed on each thread of the male helicoid; a pinion driven at a fixed position, and engaged with the spur gear; a linear guide ring provided around the gear/helicoid ring, and linearly guided along an optical axis without rotating; a circumferential groove which is formed on an outer peripheral surface of the gear/helicoid ring immediately in front of the annular rib; and a plurality of bayonet lugs which project from a rear end of the linear guide ring to be engaged in the circumferential groove so that the gear/helicoid ring and the linear guide ring move together in the optical axis direction while allowing the gear/helicoid ring to rotate freely relative to the linear guide ring. A rotation of the gear/helicoid ring via rotation of the pinion causes at least one lens group, which is linearly guided along the optical axis via the linear guide ring, to move along the optical axis. A cutout portion is formed on a rear end of the annular rib wherein a rear end of at least one thread of the male helicoid is cut out along both a root between two adjacent threads of the male helicoid and a root between two adjacent teeth of the spur gear. An element of the lens barrel enters the cutout portion when the gear/helicoid ring retracts to a rear moving limit thereof.

The lens barrel can include a holder which holds an image pick-up device and includes a stop projection, wherein the rear moving limit of the gear/helicoid ring is determined by engagement of the stop projection with a stop surface which is formed on the annular rib in the cutout portion to extend along the root between two adjacent teeth of the spur gear.

The lens barrel can include a moving ring which supports the lens group and includes at least one cam follower, wherein at least one cam groove in which the cam follower is engaged is formed on the gear/helicoid ring.

It is desirable for the holder to be fixed to a rear end surface of the stationary barrel.

It is desirable for the pinion to be elongated in a direction parallel to the optical axis.

It is desirable for the moving ring to be linearly guided along the optical axis without rotating.

It is desirable for the lens barrel to be a zoom lens barrel, and for the lens group to be a focal length varying lens group.

The lens barrel can include a linear guide ring provided around said gear/helicoid ring, and linearly guided along an optical axis without rotating, said linear guide ring guiding at least one lens group along said optical axis; a circumferential groove which is formed on an outer peripheral surface of said gear/helicoid ring adjacent to and in front of said annular rib; and a plurality of bayonet lugs which project from a rear end of said linear guide ring to be engaged in said circumferential groove so that said gear/helicoid ring and said linear guide ring move together in said optical axis direction while allowing said gear/helicoid ring to rotate freely relative to said linear guide ring.

The present disclosure relates to subject matter contained in Japanese Patent Application No.2003-028664 (filed on Feb. 5, 2003) which is expressly incorporated herein by reference in its entirety.

BRIEF DESCRIPTION OF THE DRAWINGS

The present invention will be described below in detail with reference to the accompanying drawings in which:

FIG. 21 is a developed view of the stationary barrel and the cam/helicoid ring in a retracted state of the zoom lens barrel; and FIG. 22 is a developed view of the stationary barrel and the cam/helicoid ring to each of which a modification is made in a retracted state of the zoom lens barrel.

DESCRIPTION OF THE PREFERRED EMBODIMENTS

Figure 1:
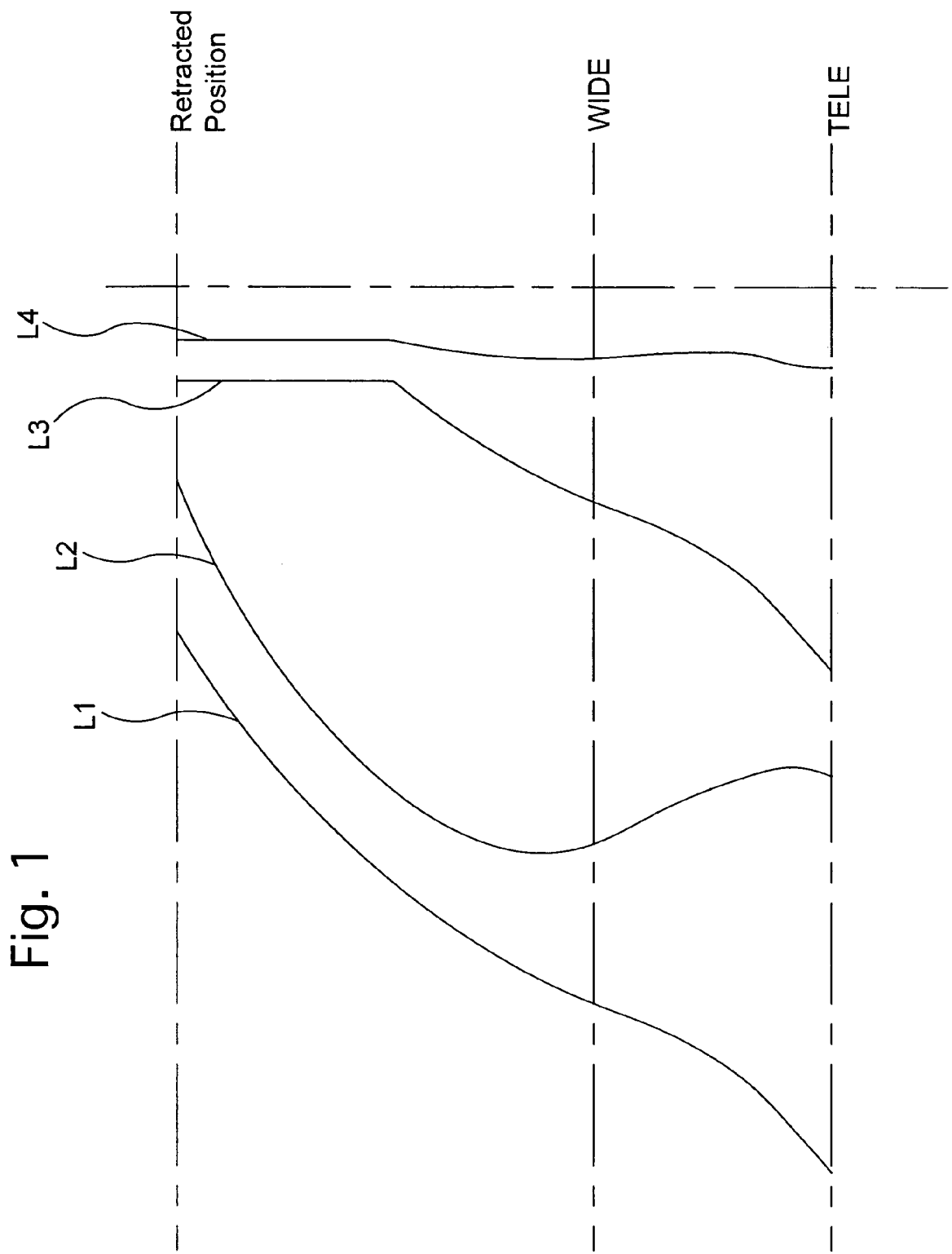
FIG. 1 is a diagram showing reference moving paths of zoom lens groups of a zoom lens system provided in an embodiment of a zoom lens barrel according to the present invention.
Figure 2:
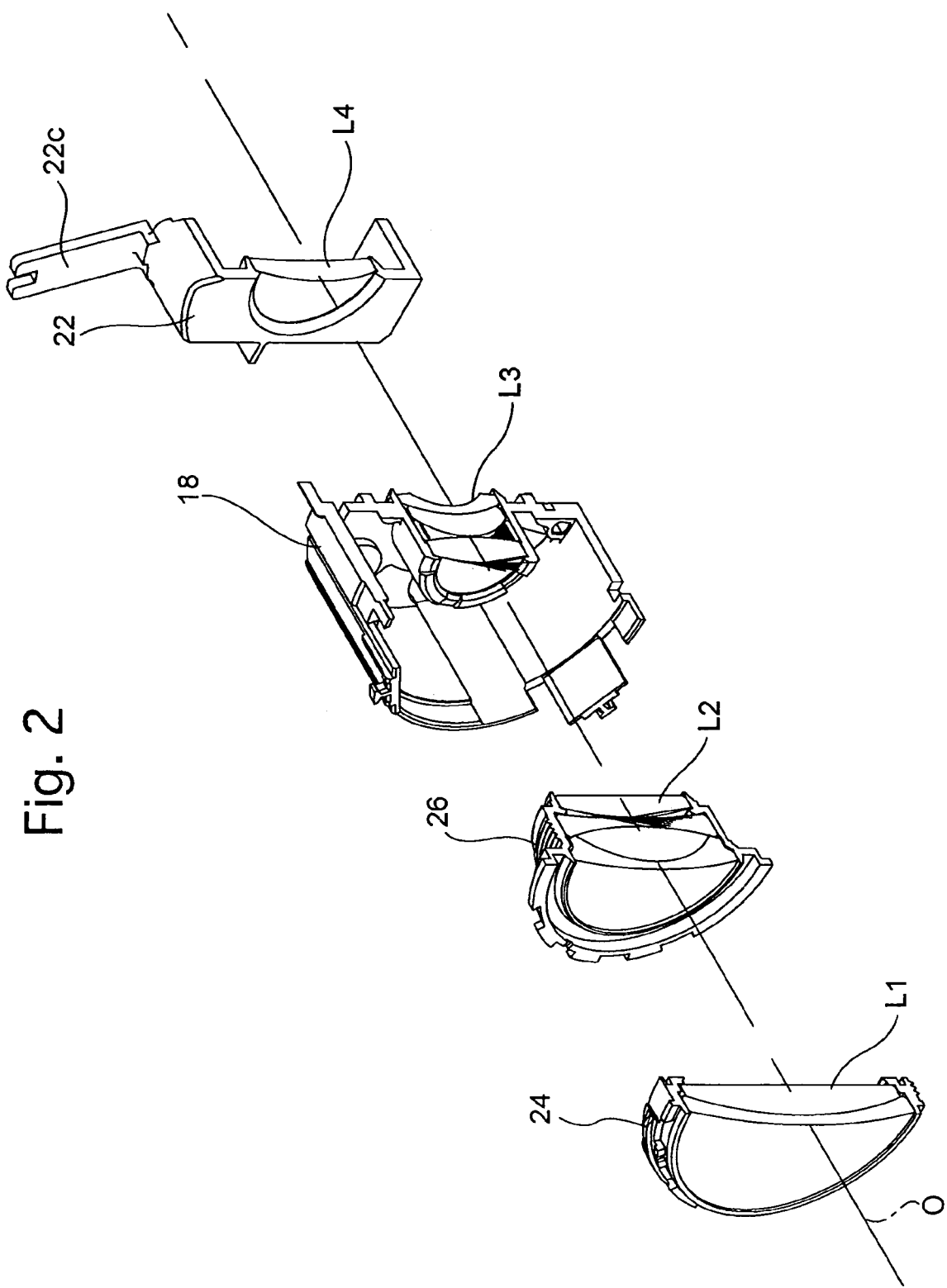
FIG. 2 is an exploded perspective view in axial section of the zoom lens groups and lens support frames.

First of all, a zoom lens system (zoom lens optical system) provided in an embodiment of a zoom lens barrel of a digital camera according to the present invention will be hereinafter discussed with reference to FIGS. 1 through 5. The zoom lens system of the zoom lens barrel 10 is a vari-focal lens system consisting of four lens groups: a positive first lens group L1, a negative second lens group L2, a positive third lens group L3 and a positive fourth lens group L4, in that order from the object side (left side as viewed in FIG. 3). The first through third lens groups L1, L2 and L3 are moved relative to one another along an optical axis O to vary the focal length of the zoom lens system and the fourth lens group L4 is moved along the optical axis O to make a slight focus adjustment, i.e., to adjust a slight focus deviation caused by the variation of the focal length. During the operation of varying the focal length of the zoom lens system between wide angle and telephoto, the first lens group L1 and the third lens group L3 move along the optical axis while maintaining the distance therebetween. The fourth lens group L4 also serves as a focusing lens group. FIG. 1 shows both moving paths of the first through fourth lens groups L1 through L4 during the zooming operation and moving paths for advancing/retracting operation. By definition, a vari-focal lens is one whose focal point slightly varies when varying the focal length, and a zoom lens is one whose focal point does not vary substantially when varying the focal length. However, the vari-focal lens system of the present invention is also hereinafter referred to as a zoom lens system.

Figure 8:
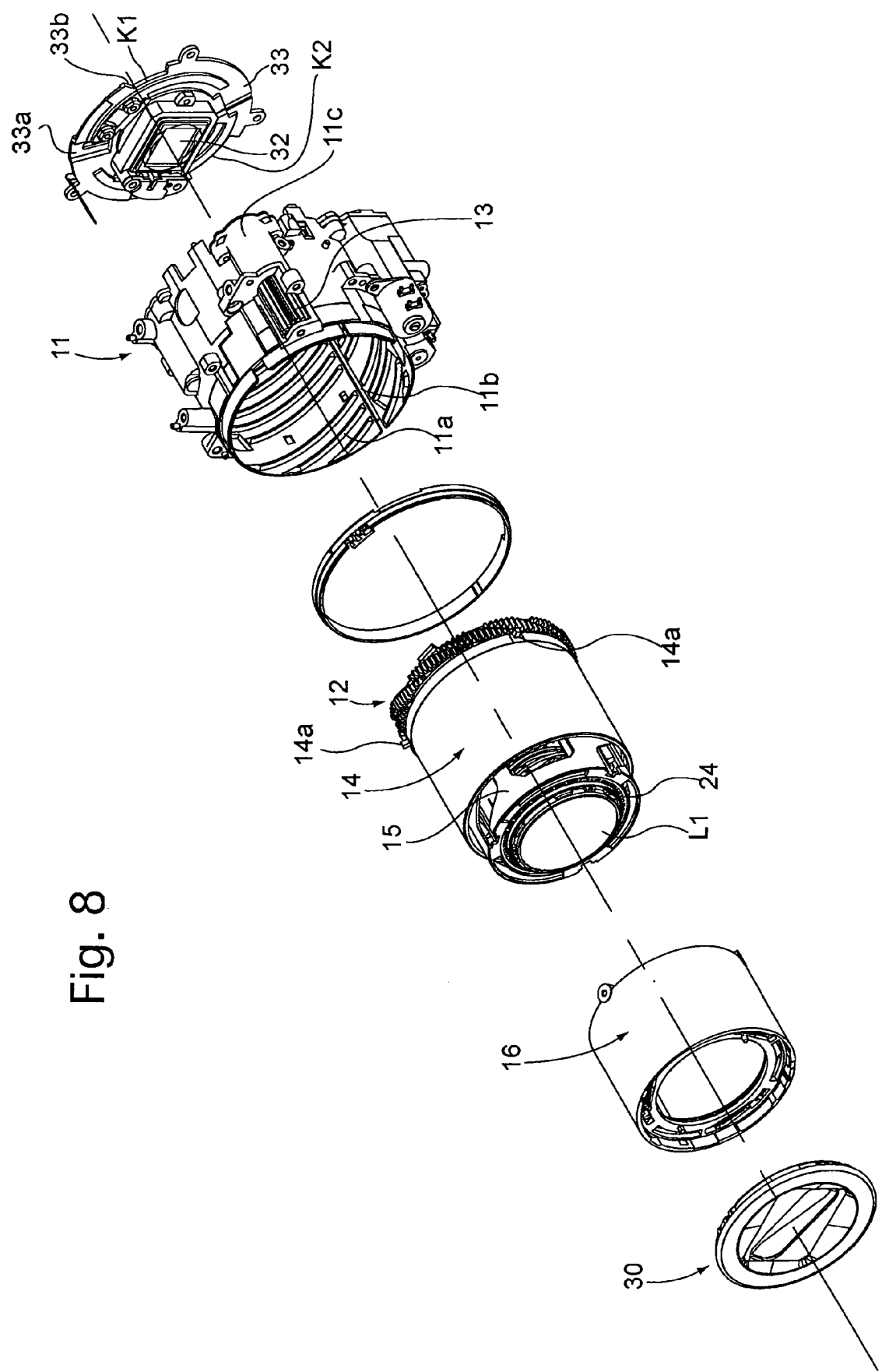
FIG. 8 is an exploded perspective view of a portion of the zoom lens barrel shown in FIG. 3.
Figure 9:
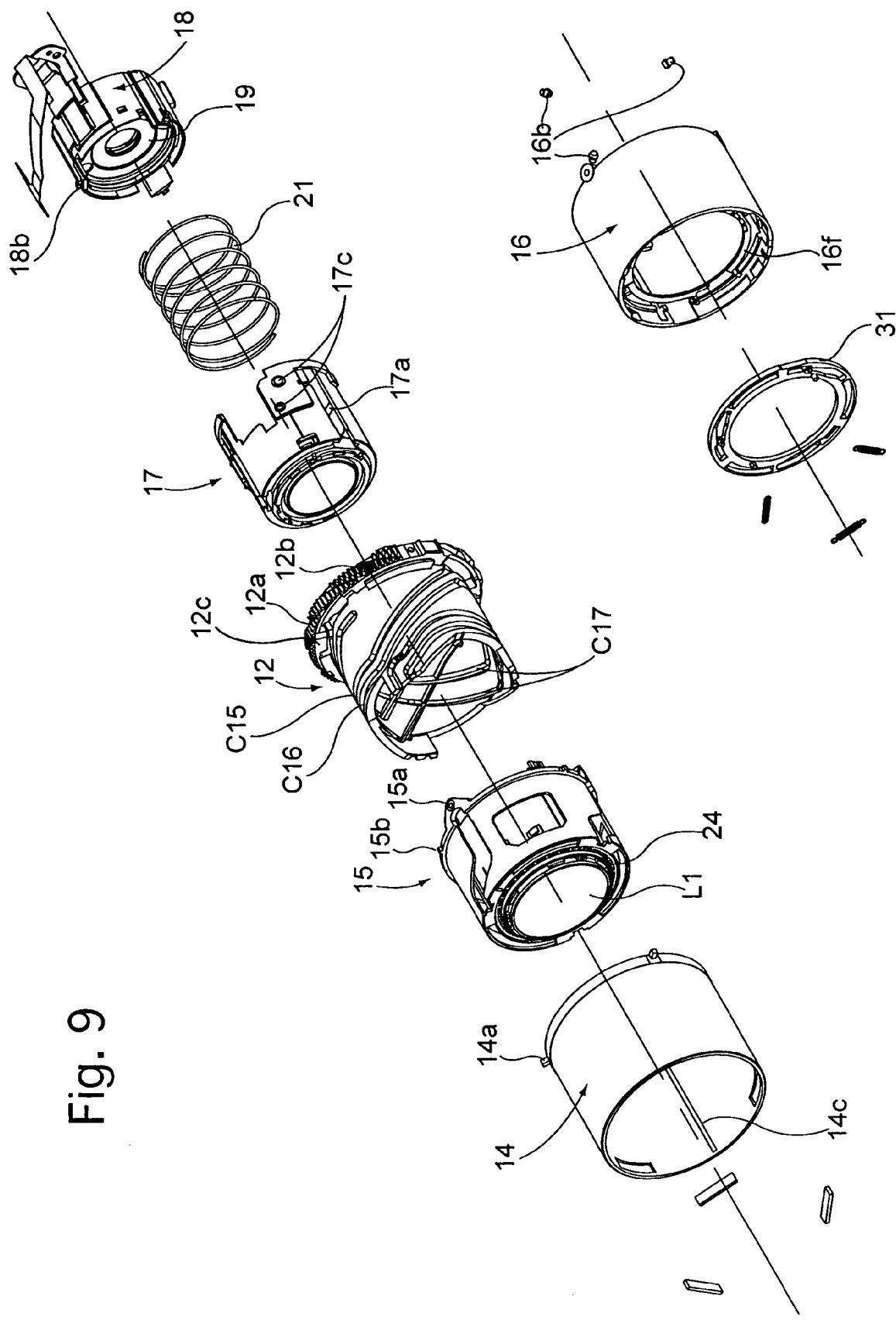
FIG. 9 is an exploded perspective view of a portion of the zoom lens barrel shown in FIG. 3.
Figure 10:
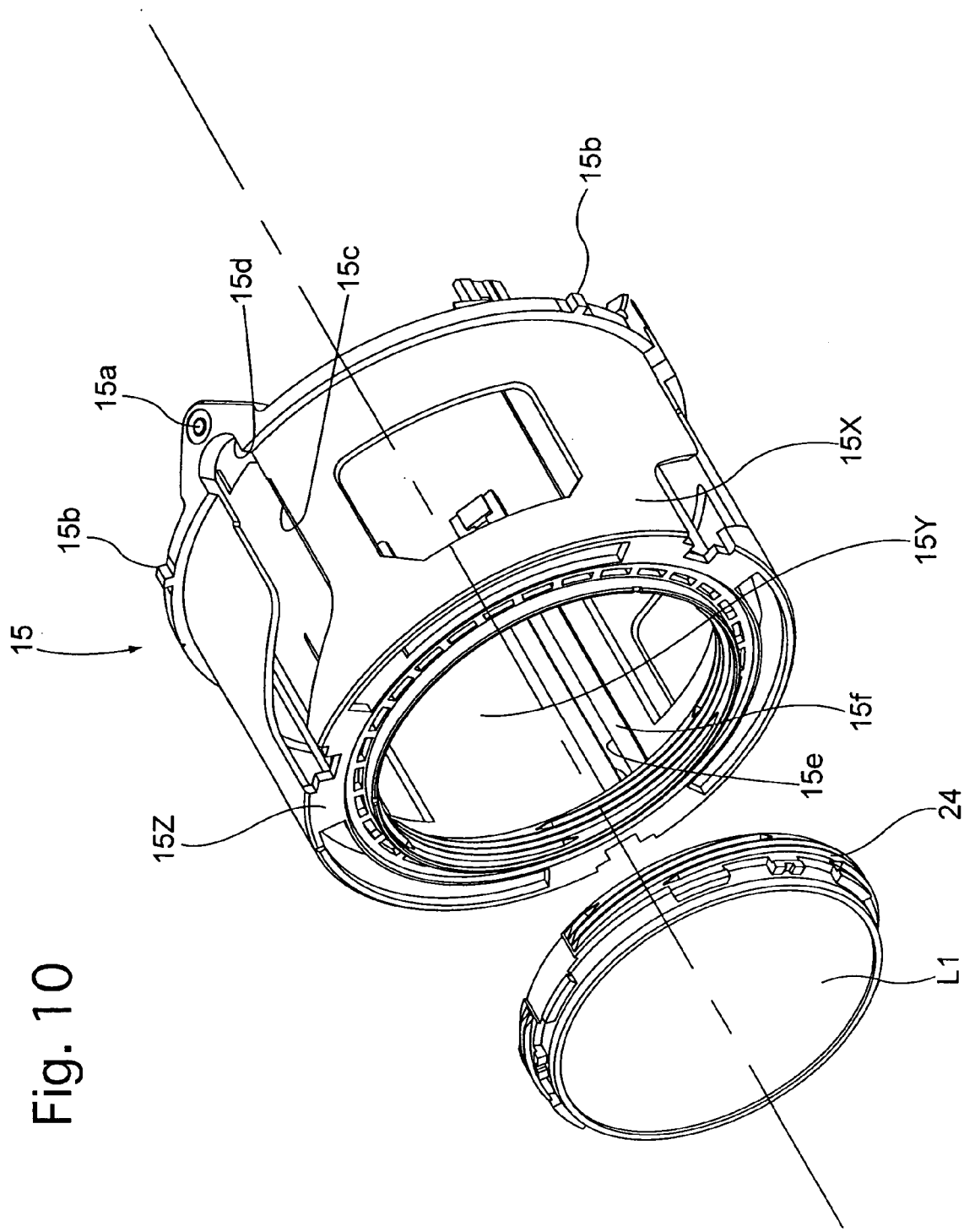
FIG. 10 is an exploded perspective view of a portion of the zoom lens barrel shown in FIG. 3, showing a first lens group moving ring and peripheral elements.
Figure 15:
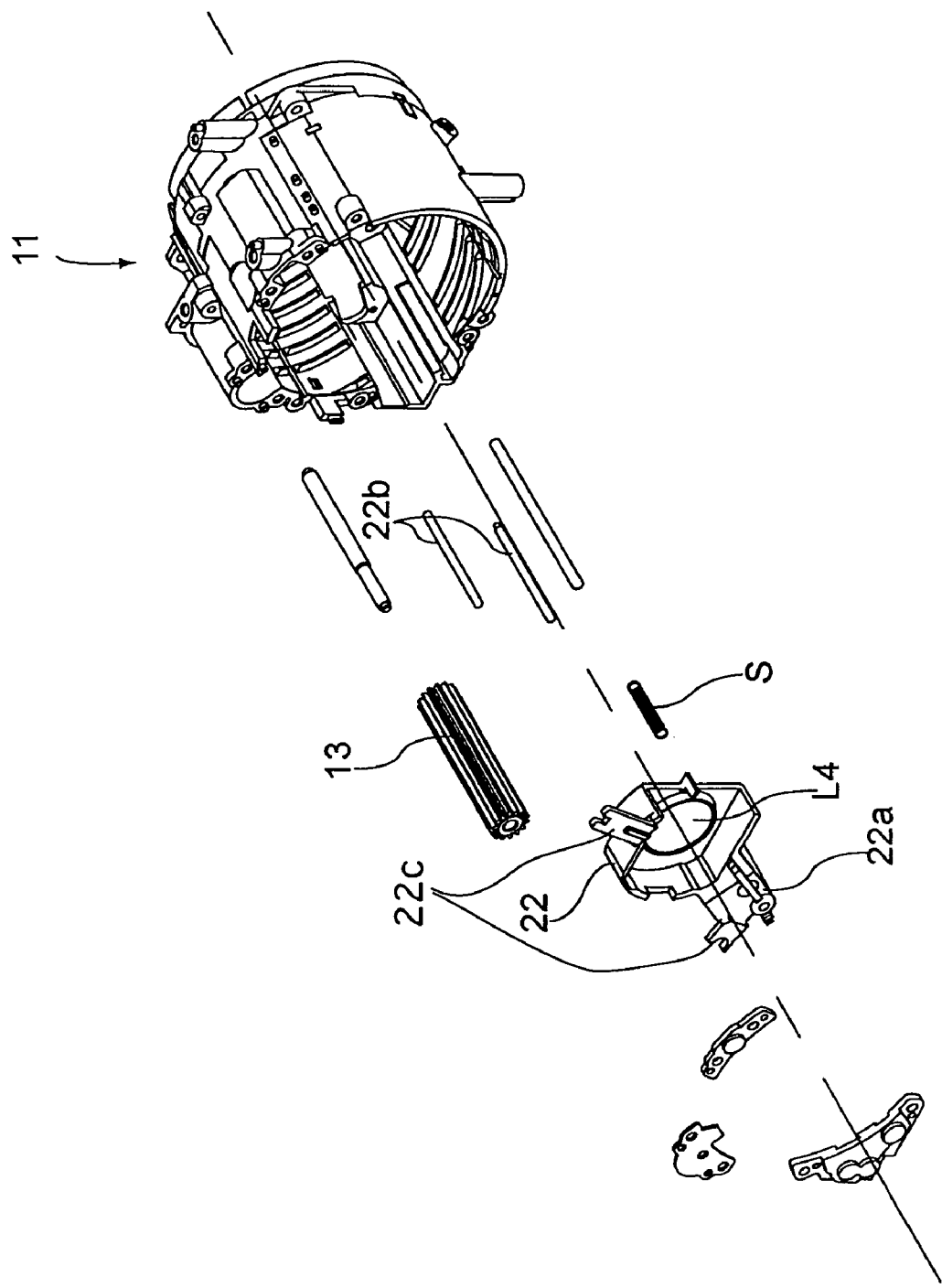
FIG. 15 is an exploded perspective view of a portion of the zoom lens barrel shown in FIG. 3, showing the stationary barrel, a fourth lens group and peripheral elements.

The overall structure of the zoom lens barrel 10 will be hereinafter discussed with reference to FIGS. 1 through 19. The zoom lens barrel 10 is provided with a stationary barrel 11 which is fixed to a camera body (not shown). As shown in FIG. 8, the stationary barrel 11 is provided on an inner peripheral surface thereof with a female helicoid 11a and a set of three linear guide grooves 11b which extend parallel to the optical axis O. The zoom lens barrel 10 is provided inside the stationary barrel 11 with a cam/helicoid ring (cam ring) 12. As shown in FIG. 9, the cam/helicoid ring 12 is provided, on an outer peripheral surface thereof in the vicinity of the rear end of the cam/helicoid ring 12, with a male helicoid 12a which is engaged with the female helicoid 11a of the stationary barrel 11. The cam/helicoid ring 12 is provided on the thread of the male helicoid 12a with a spur gear 12b which is always engaged with a drive pinion 13 (see FIG. 15). The drive pinion 13 is provided in a recessed portion 11c (see FIG. 3) formed on an inner peripheral surface of the stationary barrel 11. The drive pinion 13 is supported by the stationary barrel 11 to be freely rotatable in the recessed portion 11c on an axis of the drive pinion 13. Accordingly, forward and reverse rotations of the drive pinion 13 cause the cam/helicoid ring 12 to move forward rearward along the optical axis O while rotating about the optical axis O due to the engagement of the drive pinion 13 with the spur gear 12b and the engagement of the female helicoid 11a with the male helicoid 12a. In the present embodiment of the zoom lens barrel 10, the cam/helicoid ring 12 is the only element thereof which rotates about the optical axis O.

The zoom lens barrel 10 is provided around the cam/helicoid ring 12 with a linear guide ring 14. The linear guide ring 14 is provided, on an outer peripheral surface thereof at the rear end of the linear guide ring 14, with a set of three linear guide projections 14a which project radially outwards to be engaged in the set of three linear guide grooves 11b of the stationary barrel 11, respectively. The linear guide ring 14 is provided, on an inner peripheral surface thereof at the rear end of the linear guide ring 14, with a set of three bayonet lugs 14b (only one of them appears in FIGS. 1 through 4). The cam/helicoid ring 12 is provided, on an outer peripheral surface thereof immediately in front of the male helicoid 12a (the spur gear 12b), with a circumferential groove 12c in which the set of three bayonet lugs 14b are engaged to be rotatable about the optical axis O in the circumferential groove 12c. Accordingly, the linear guide ring 14 is linearly movable along the optical axis O together with the cam/helicoid ring 12 without rotating about the optical axis O.

Figure 4:
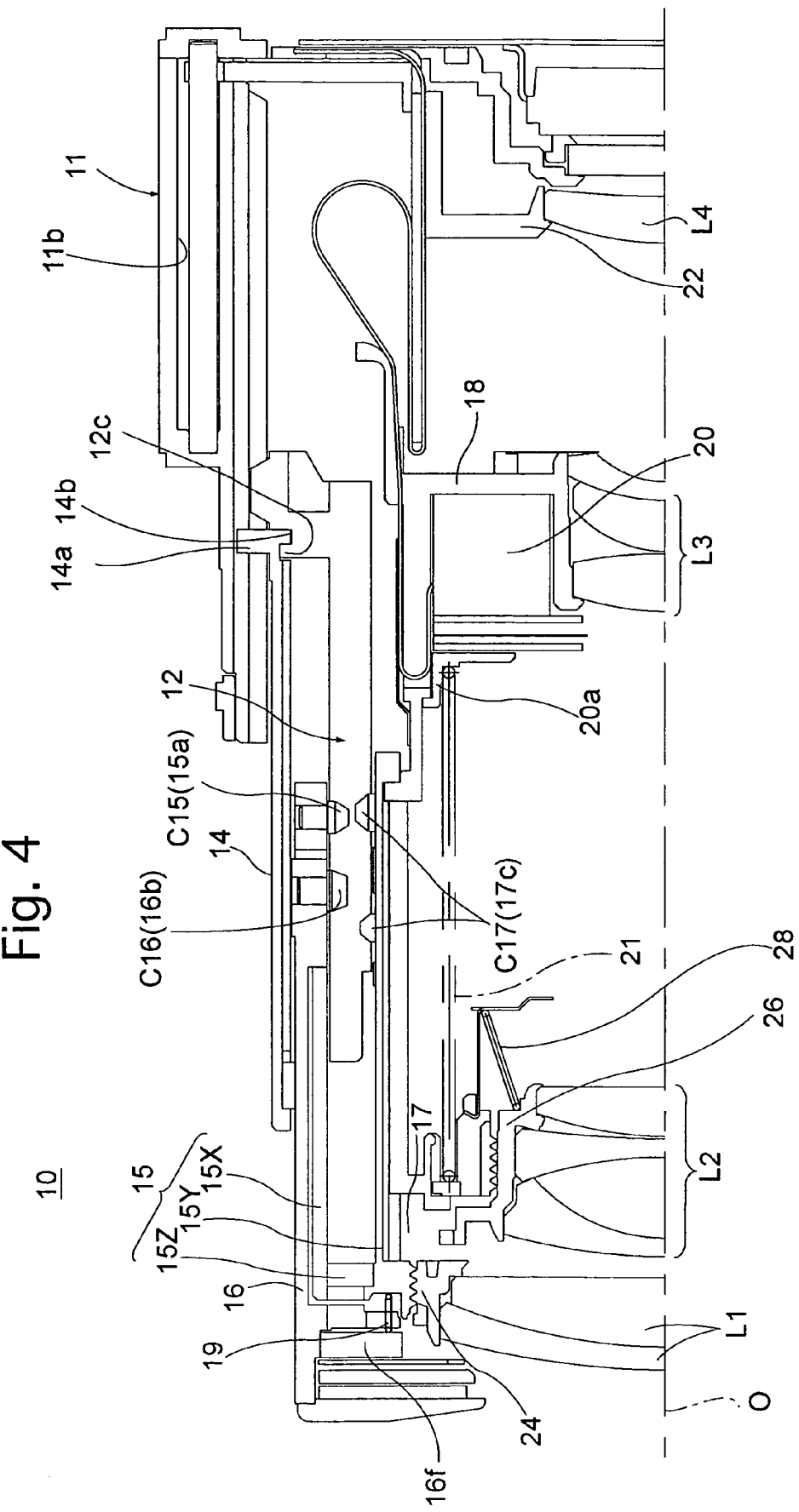
FIG. 4 is a view similar to that of FIG. 3, and shows an upper half of the zoom lens barrel from the optical axis thereof at the wide-angle extremity.
Figure 16:
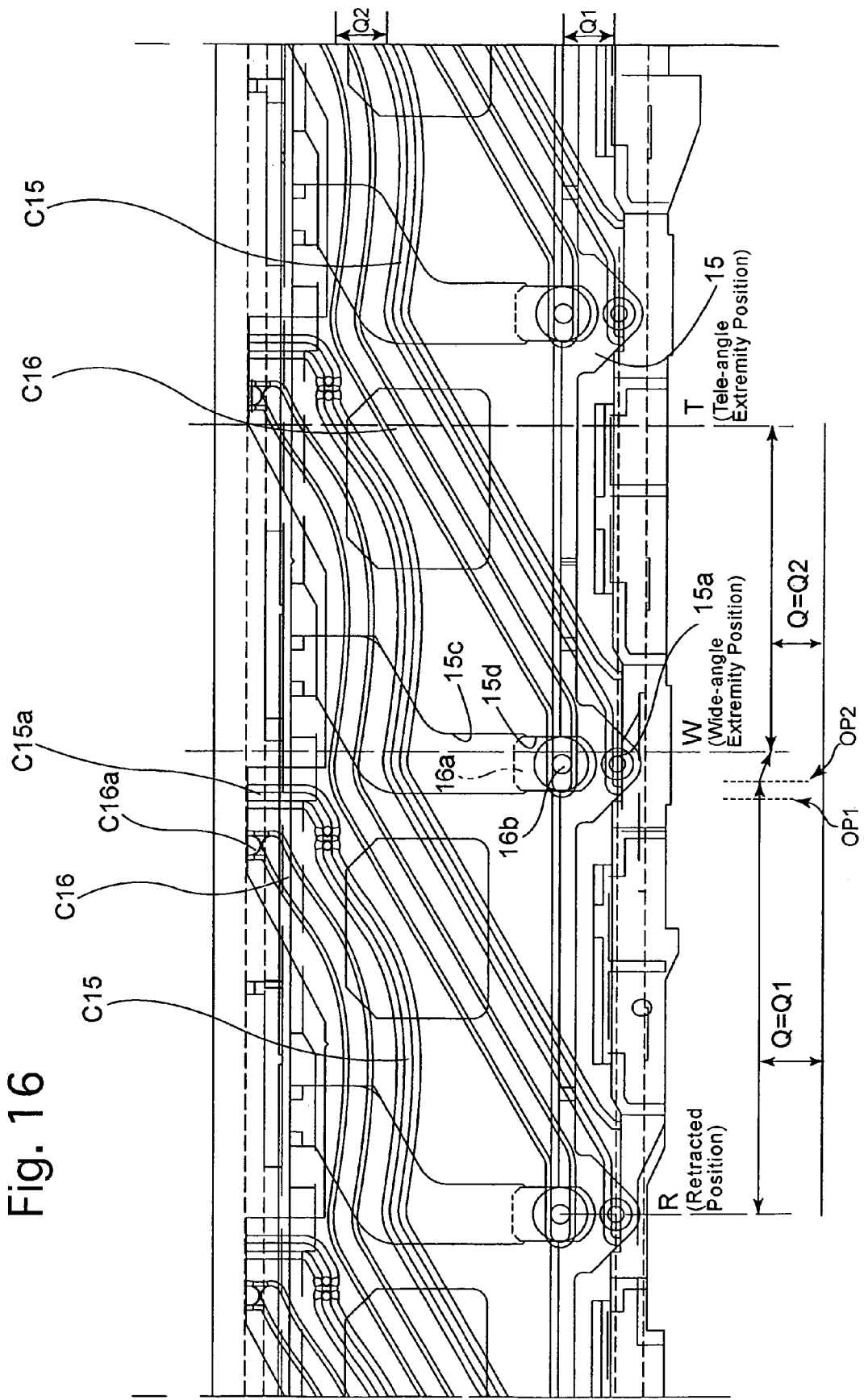
FIG. 16 is a developed view of a cam/helicoid ring, showing a set of first cam grooves of the cam/helicoid ring for moving the first lens group and a set of third cam grooves of the cam/helicoid ring for moving an exterior ring.

The zoom lens barrel 10 is provided around the cam/helicoid ring 12 with a first lens group moving ring (first lens frame) 15 which supports the first lens group L1, and is further provided around the first lens group moving ring 15 with an exterior ring 16 serving as a light shield member. The zoom lens barrel 10 is provided inside the cam/helicoid ring 12 with a second lens group moving ring (second lens frame) 17 which supports the second lens group L2. As shown in FIGS. 4, 9 and 16, the cam/helicoid ring 12 is provided on an outer peripheral surface thereof with a set of three first cam grooves C15 for moving the first lens group moving ring 15 and a set of three third cam grooves C16 for moving the exterior ring 16, and is further provided on an inner peripheral surface of the cam/helicoid ring 12 with a set of six second cam grooves C17 for moving the second lens group moving ring 17 (see FIG. 19). The set of three first cam grooves C15 and the set of three third cam grooves C16 are slightly different in shape, and are apart from one another at predetermined intervals in a circumferential direction of the cam/helicoid ring 12. The set of six second cam grooves C17 have the same basic cam diagrams, and includes three front second cam grooves C17, and three rear second cam grooves C17 which are positioned behind the three front second cam grooves C17 in the optical axis direction (vertical direction as viewed in FIG. 19), respectively; the three front second cam grooves C17 are apart from one another in a circumferential direction of the cam/helicoid ring 12 while the three rear second cam grooves C17 are apart from one another in a circumferential direction of the cam/helicoid ring 12. Each of the first lens group moving ring 15, the exterior ring 16 and the second lens group moving ring 17 is linearly guided along the optical axis O. A rotation of the cam/helicoid ring 12 causes the first lens group moving ring 15, the exterior ring 16 and the second lens group moving ring 17 to move along the optical axis O in accordance with the contours of the set of three first cam grooves C15, the set of three third cam grooves C16 and the set of six second cam grooves C17, respectively.

Figure 5:
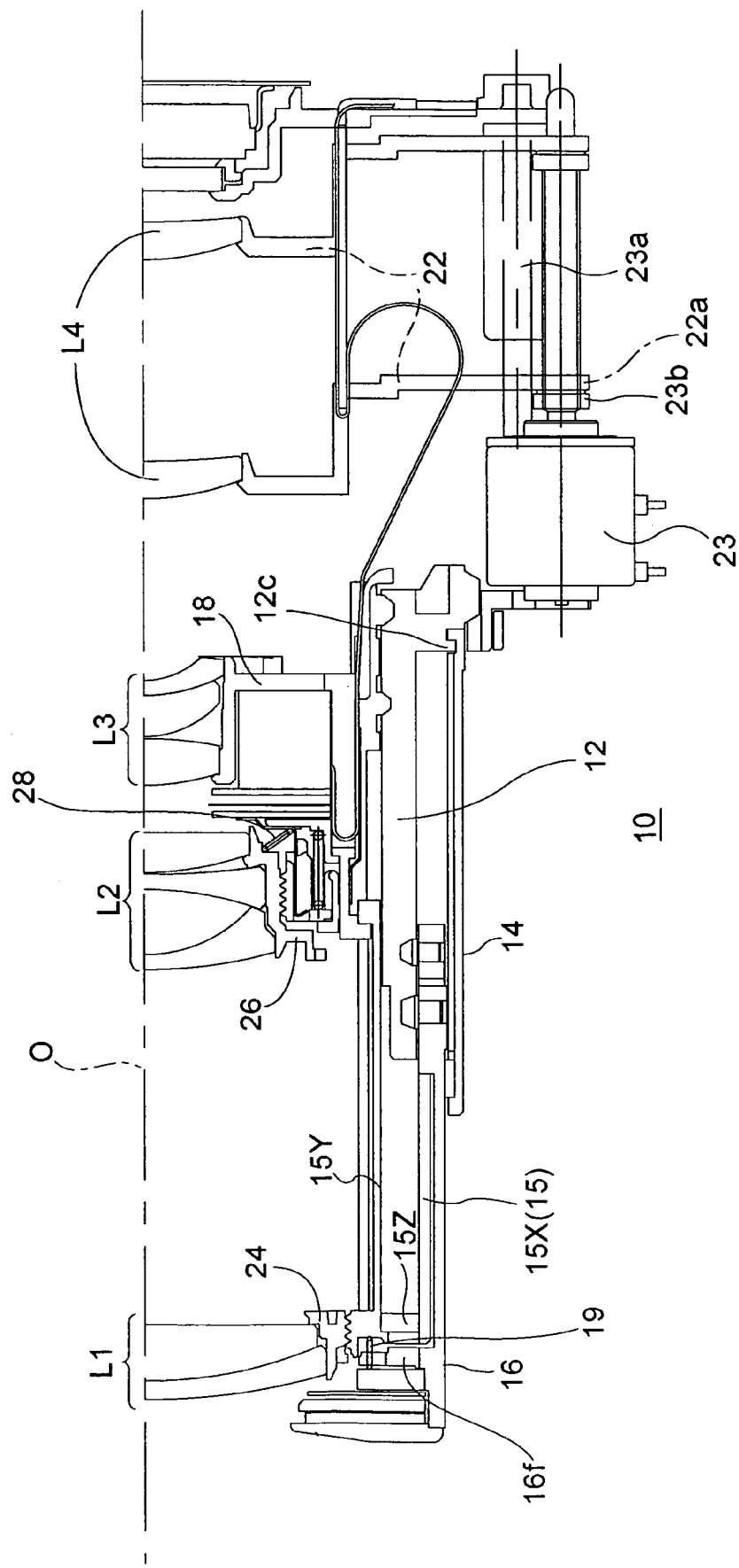
FIG. 5 is a view similar to that of FIG. 3, and shows a lower half of the zoom lens barrel from the optical axis thereof at the telephoto extremity.

Linear guide mechanical linkages among the first lens group moving ring 15, the exterior ring 16 and the second lens group moving ring 17 will be discussed hereinafter. As shown in FIGS. 4 and 5, the first lens group moving ring 15 is provided with an outer ring portion 15X, an inner ring portion 15Y and a flange wall 15Z by which the front end of the outer ring portion 15X and the front end of the inner ring portion 15Y are connected to have a substantially U-shaped cross section. The cam/helicoid ring 12 is positioned between the outer ring portion 15X and the inner ring portion 15Y. Three cam followers 15a which are respectively engaged in the set of three first cam grooves C15 are fixed to the outer ring portion 15X in the vicinity of the rear end thereof. The zoom lens barrel 10 is provided with a first lens group support frame 24 which supports the first lens group L1. As shown in FIGS. 8 and 9, the first lens group support frame 24 is fixed to the inner ring portion 15Y at the front end thereof through a male thread portion and a female thread portion which are formed on an outer peripheral surface of the first lens group support frame 24 and an inner peripheral surface of the inner ring portion 15Y, respectively (see FIG. 10). The first lens group support frame 24 can be rotated relative to the first lens group moving ring 15 to adjust the position of the first lens group support frame 24 along the optical axis O relative to the first lens group moving ring 15 to carry out a zooming adjustment (which is an adjustment operation which is carried out in a manufacturing process of the zoom lens barrel if necessary).

The linear guide ring 14, which is linearly guided along the optical axis O by the stationary barrel 11, is provided, on an inner peripheral surface thereof at approximately equiangular intervals (intervals of approximately 120 degrees), with a set of three linear guide grooves 14c (only one of them appears in FIG. 9), while the outer ring portion 15X of the first lens group moving ring 15 is provided at the rear end thereof with a set of three linear guide projections 15b (see FIG. 10) which project radially outwards to be engaged in the set of three linear guide grooves 14c, respectively. The outer ring portion 15X is provided with a set of three assembly slots 15c (see FIGS. 10 and 16), and is further provided at the rear ends of the set of three assembly slots 15c with a set of linear guide slots 15d which are communicatively connected with the set of three assembly slots 15c and are smaller in width than the set of three assembly slots 15c, respectively. Three linear guide keys 16a which are fixed to the exterior ring 16 which is positioned between the outer ring portion 15X and the linear guide ring 14 are engaged in the set of linear guide slots 15d, respectively. The maximum relative moving distance between the first lens group moving ring 15 and the exterior ring 16 along the optical axis O (the difference in shape between the set of three first cam grooves C15 and the set of three third cam grooves C16) is only a slight distance, and the length of each linear guide slot 15d in the optical axis direction is correspondingly short. A set of three cam followers 16b which are engaged in the set of three third cam grooves C16 are fixed to the set of three linear guide keys 16a, respectively (see FIGS. 7 and 9).

Figure 3:
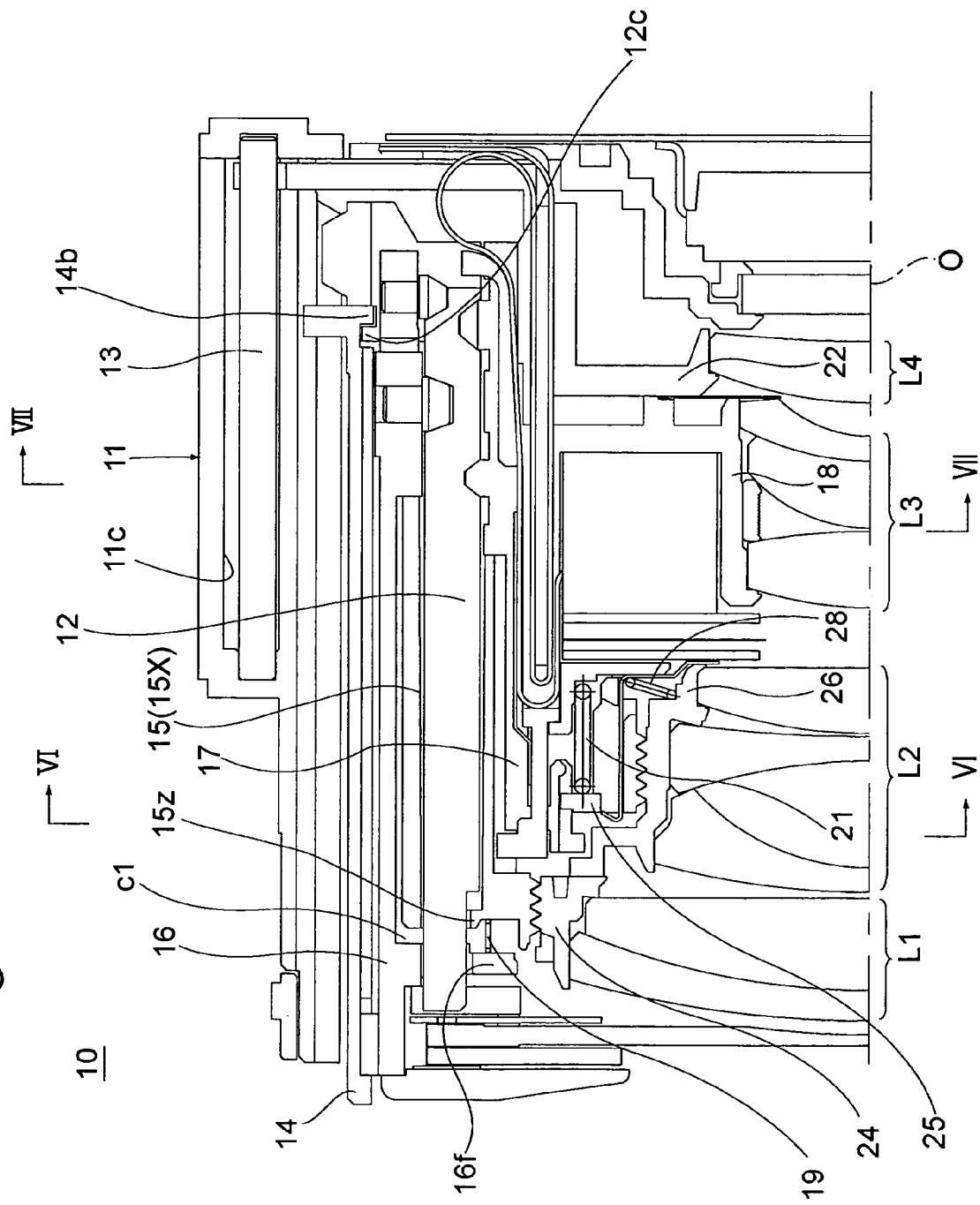
FIG. 3 is a longitudinal cross sectional view of the embodiment of the zoom lens barrel according to the present invention, showing an upper half of the zoom lens barrel from the optical axis thereof in a retracted state.

The zoom lens barrel 10 is provided between the first lens group moving ring 15 and the exterior ring 16 with a compression coil spring 19 (see FIGS. 3 through 5). The compression coil spring 19 biases the first lens group moving ring 15 rearward to remove backlash between the set of three first cam grooves C15 and the set of three cam followers 15a, and at the same time, biases the exterior ring 16 forward to remove backlash between the set of three third cam grooves C16 and the set of three cam followers 16b.

As shown in FIG. 16, the set of three first cam grooves C15 and the set of three third cam grooves C16 are shaped slightly different from each other in their respective retracting positions, as compared with their respective photographing ranges (zooming ranges), so that the exterior ring 16 advances from the photographing position thereof relative to the first lens group moving ring 15 to prevent barrier blades of a lens barrier unit 30 (see FIG. 8) and the first lens group L1 from interfering with each other when the zoom lens barrel 10 is fully retracted as shown in FIG. 3. More specifically, as shown in FIG. 16, the shapes of the first cam grooves C15 and the third cam grooves C16 are determined so that the distance Q in the optical axis direction between the first cam grooves C15 and the third cam grooves C16 in the preparation ranges (i.e., the range between the retracted position and the position at which the lens barrier unit 30 is fully open) is longer than that of the zoom ranges (i.e., the range between the wide-angle extremity and the telephoto extremity). Namely, throughout the entirety of the preparation ranges the distance Q=Q1, however, the distance Q gradually reduces from a position OP2 at a predetermined distance from a fully opened position OP1 of the lens barrier unit 30 (i.e., from a position whereby the first lens group L1 and the lens barrier unit 30 do not interfere with each other), so that the distance Q=Q2 (<Q1) at the wide-angle extremity, and the distance Q=Q2 in the entirety of the zoom ranges. It can be seen in FIG. 3 that a clearance cl between the flange wall 15Z of the first lens group moving ring 15 and a flange wall 16f of the exterior ring 16, when the zoom lens barrel 10 is in the retracted position, is greater than when the zoom lens barrel 10 is in a ready-to-photograph position as shown in FIG. 4 or 5. In other words, when the zoom lens barrel 10 is in a ready-to-photograph position as shown in FIG. 4 or 5, the flange wall 15Z of the first lens group moving ring 15 and the flange wall 16f of the exterior ring 16 are positioned closely to each other in order to prevent shading (caused by the lens barrier unit 30) from occurring. The lens barrier unit 30 is supported by the exterior ring 16 at the front end thereof. The zoom lens barrel 10 is provided, immediately behind the lens barrier unit 30 (between the lens barrier unit 30 and the flange wall 16f of the exterior ring 16), with a barrier opening/closing ring 31 (see FIG. 9). Rotating the barrier opening/closing ring 31 at the retracted position via rotation of the cam/helicoid ring 12 causes the barrier blades of the lens barrier unit 30 to open and shut. The mechanism for opening and closing the barrier blades using a barrier opening/closing ring such as the barrier opening/closing ring 31 is known in the art. Note that in the illustrated embodiment, although the shapes of the first cam grooves C15 and the third cam grooves C16 are determined so that the distance Q (i.e., Q2) is constant (unchanging) over the entire zoom range, the distance Q (i.e., Q2) can be determined so as to change in accordance with the focal length. Furthermore, the distance Q2 over the zoom range can be determined so as to be greater than the distance Q1 over the preparation range.

The front end of each third cam groove C16 is open on a front end surface of the cam/helicoid ring 12 to be formed as an open end C16a (see FIG. 16) through which the associated cam follower 16b of the exterior ring 16 is inserted into the third cam groove C16. Likewise, the front end of each first cam groove C15 is open on a front end surface of the cam/helicoid ring 12 to be formed as an open end C15a (see FIG. 16) through which the associated cam follower 15a of the first lens group moving ring 15 is inserted into the first cam groove C15.

Figure 6:
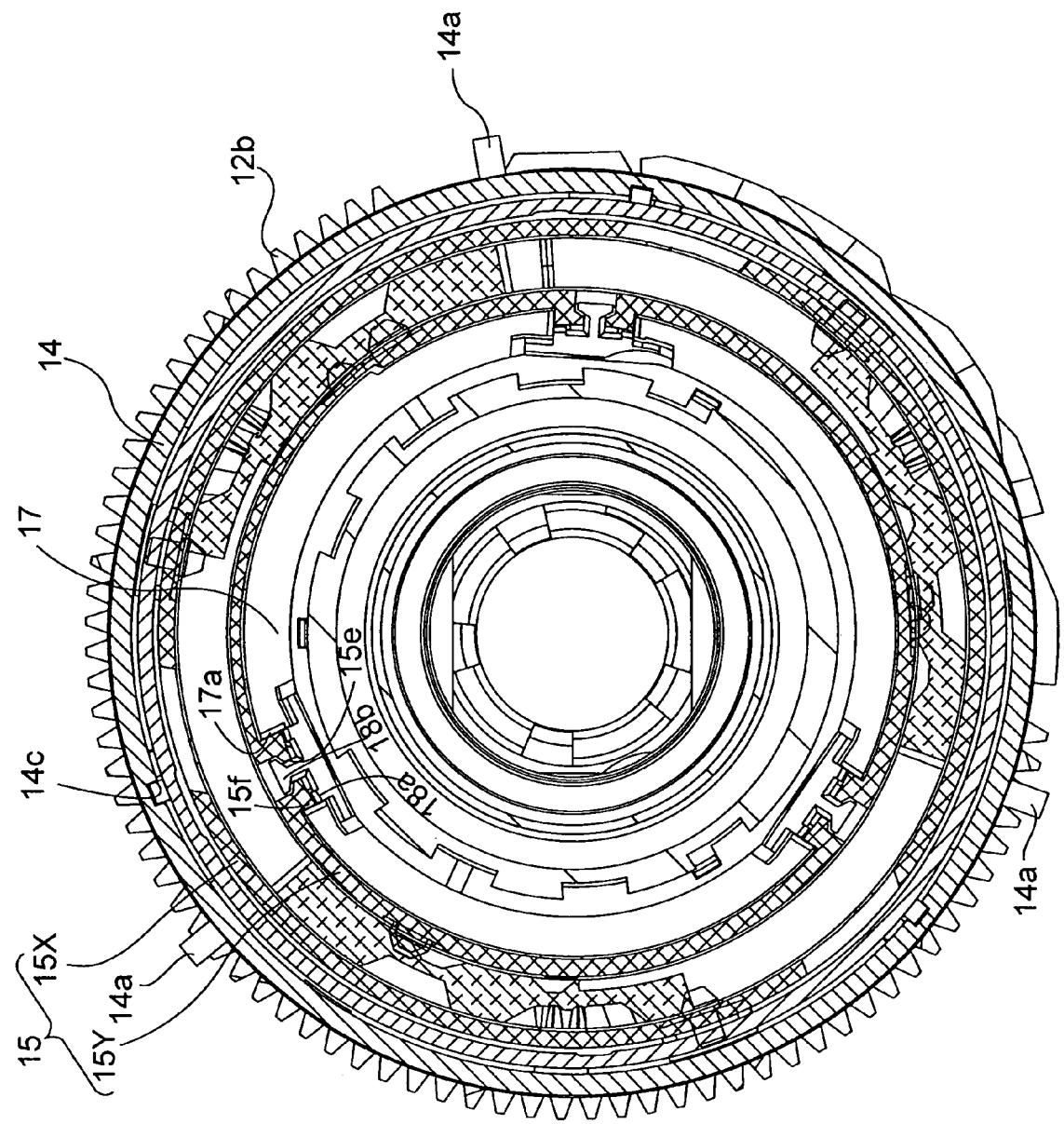
FIG. 6 is a transverse cross sectional view taken along VI—VI line shown in FIG. 3.
Figure 7:
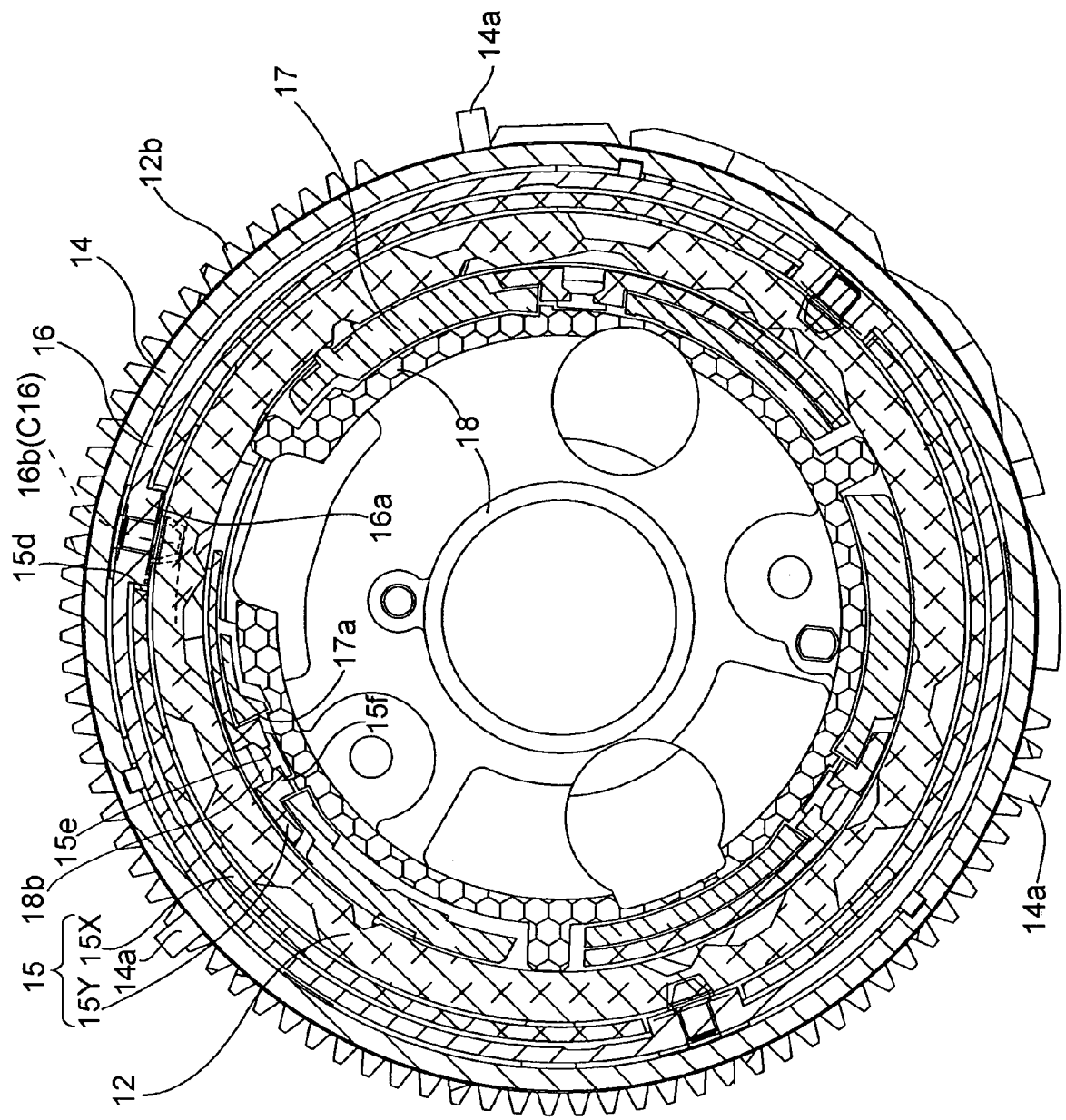
FIG. 7 is a transverse cross sectional view taken along VII—VII line shown in FIG. 3.
Figure 17:
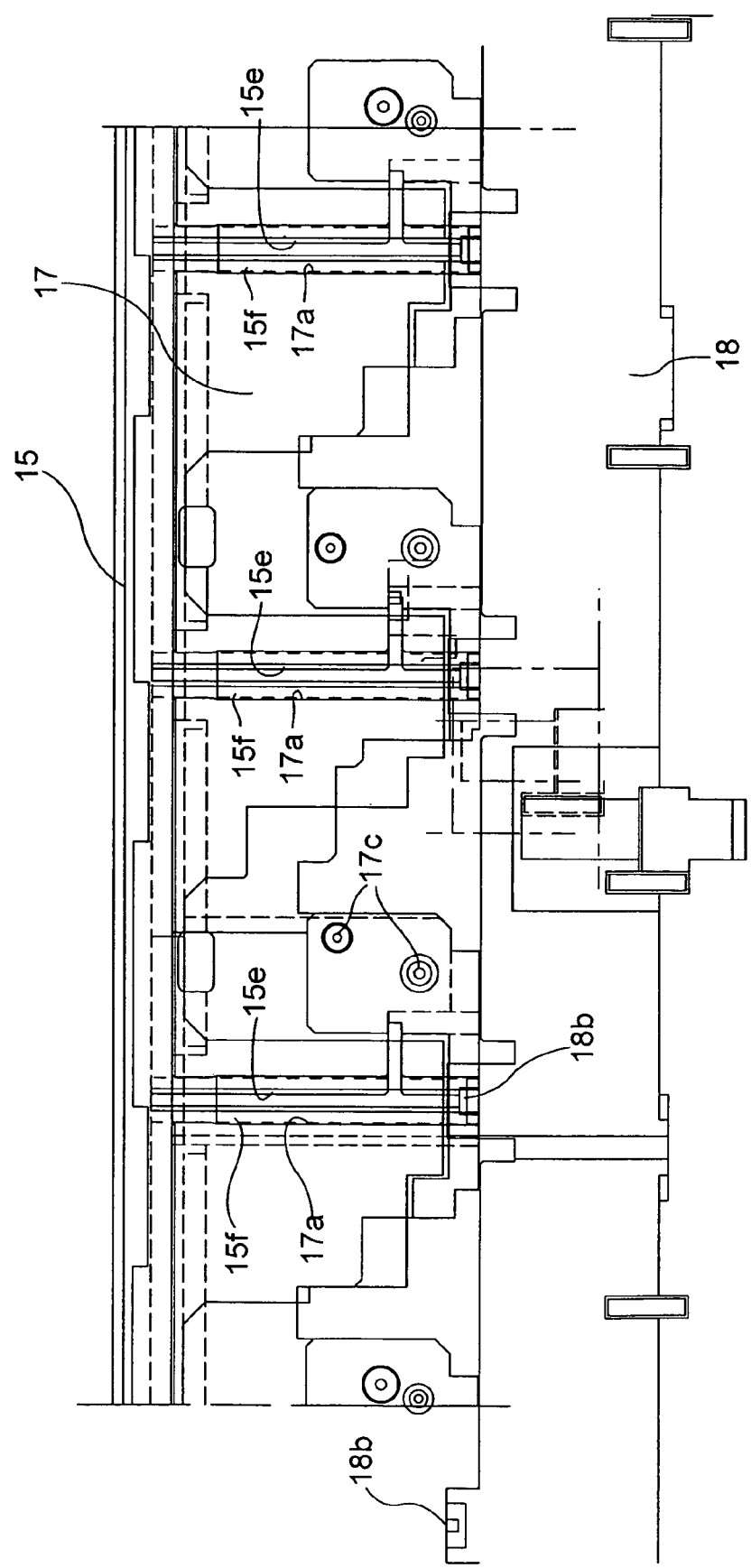
FIG. 17 is a developed view of the first lens group moving ring, the second lens group moving ring and the third lens group moving ring, showing linear guide mechanical linkages among the first through third lens group moving rings.
Figure 18:
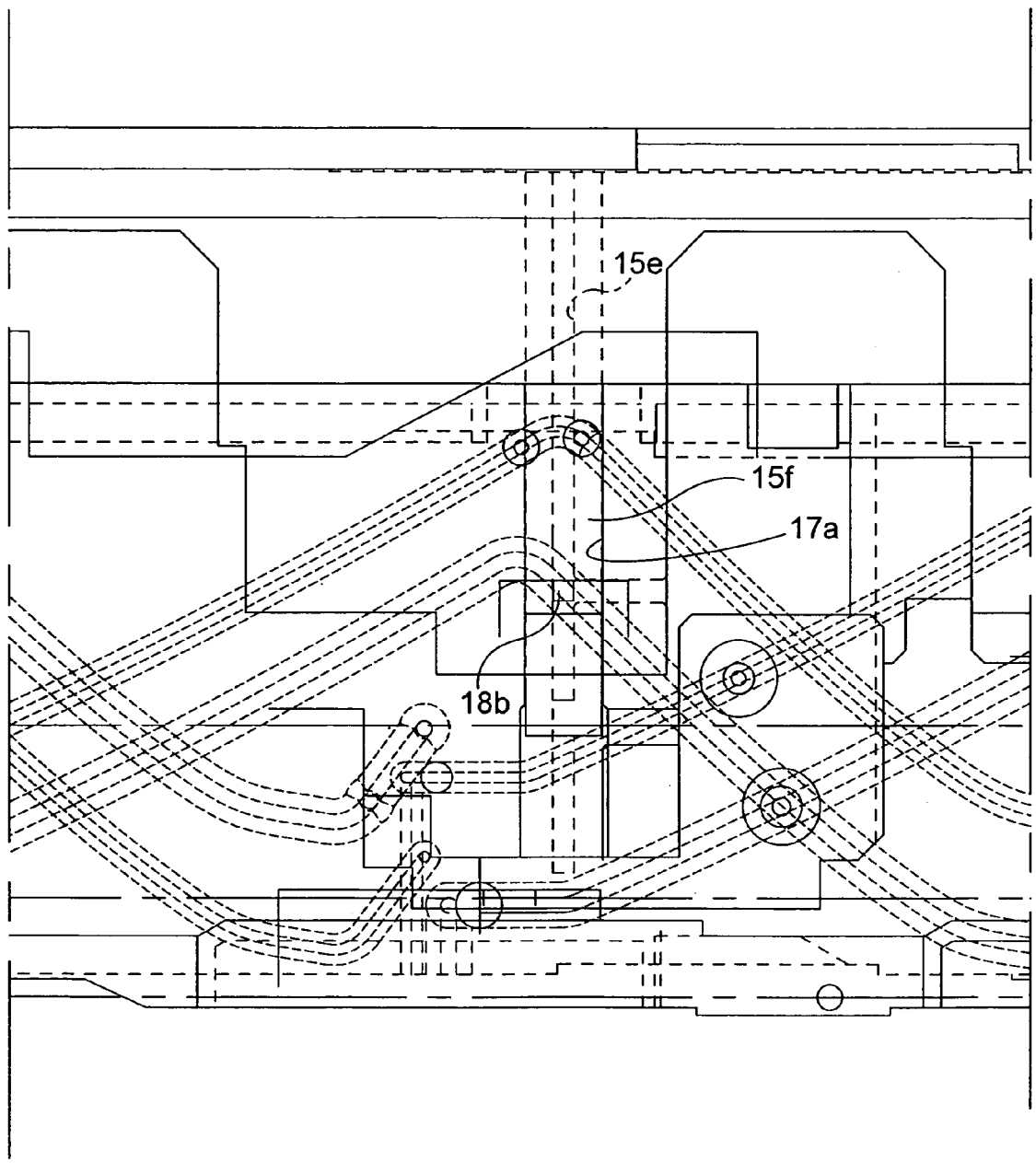
FIG. 18 is an enlarged view of a portion of the developed view shown in FIG. 17.
Figure 19:
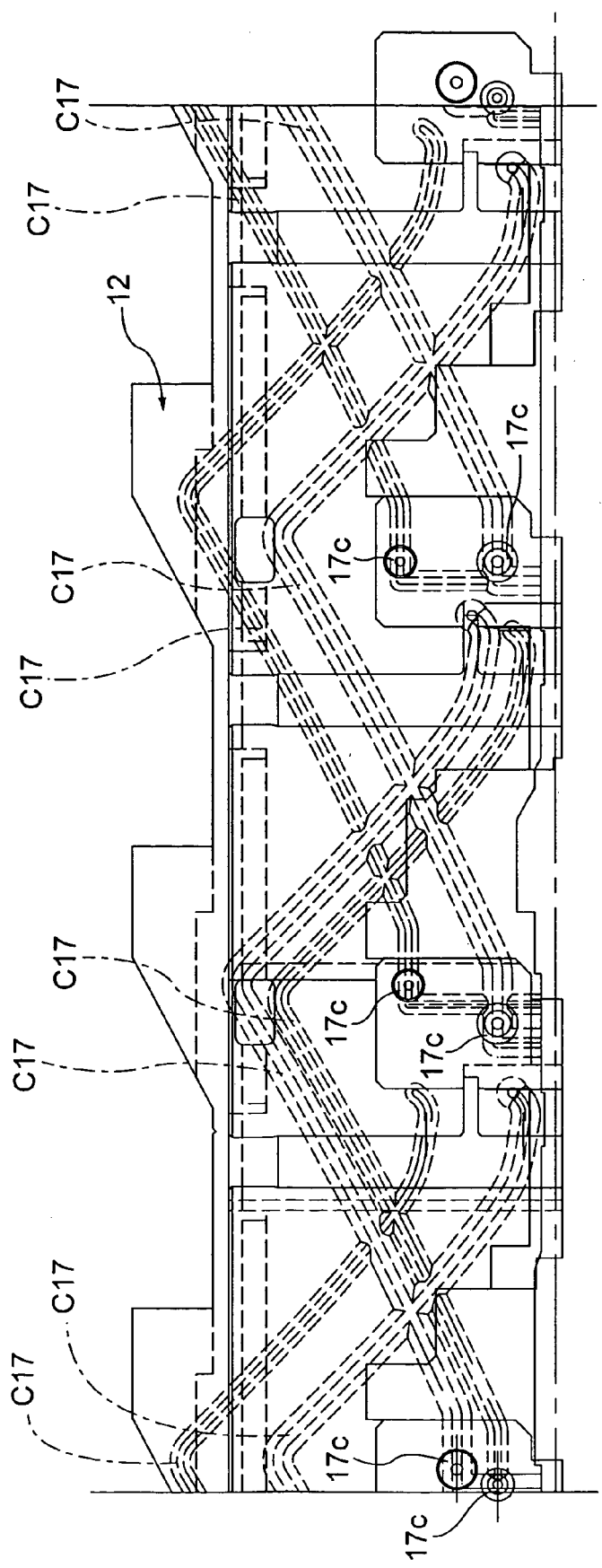
FIG. 19 is a developed view of the cam/helicoid ring, showing the shapes of a set of second cam grooves of the cam/helicoid ring for moving the second lens group.

The inner ring portion 15Y of the first lens group moving ring 15 is provided on an inner peripheral surface thereof with a set of three linear guide projections 15f which are elongated in a direction parallel to the optical axis O, while the second lens group moving ring 17 is provided with a set of three linear guide slots (linear guide through-slots) 17a which are elongated in a direction parallel to the optical axis O to be engaged with the set of three linear guide projections 15f to be freely slidable relative thereto along the optical axis O (see FIGS. 6, 7 and 17). Each linear guide projection 15f is provided along a substantially center thereof with a hanging groove 15e which is elongated in a direction parallel to the optical axis O and which has a substantially T-shaped cross section as shown in FIG. 6. The three linear guide projections 15f and the three linear guide slots 17a constitute a first linear guide mechanism. The rear end of each hanging groove 15e is closed (see FIGS. 17 and 18). The second lens group moving ring 17 is provided on an outer peripheral surface thereof with six cam followers 17c which are engaged in the set of six second cam grooves C17 of the cam/helicoid ring 12, respectively.

Figure 11:
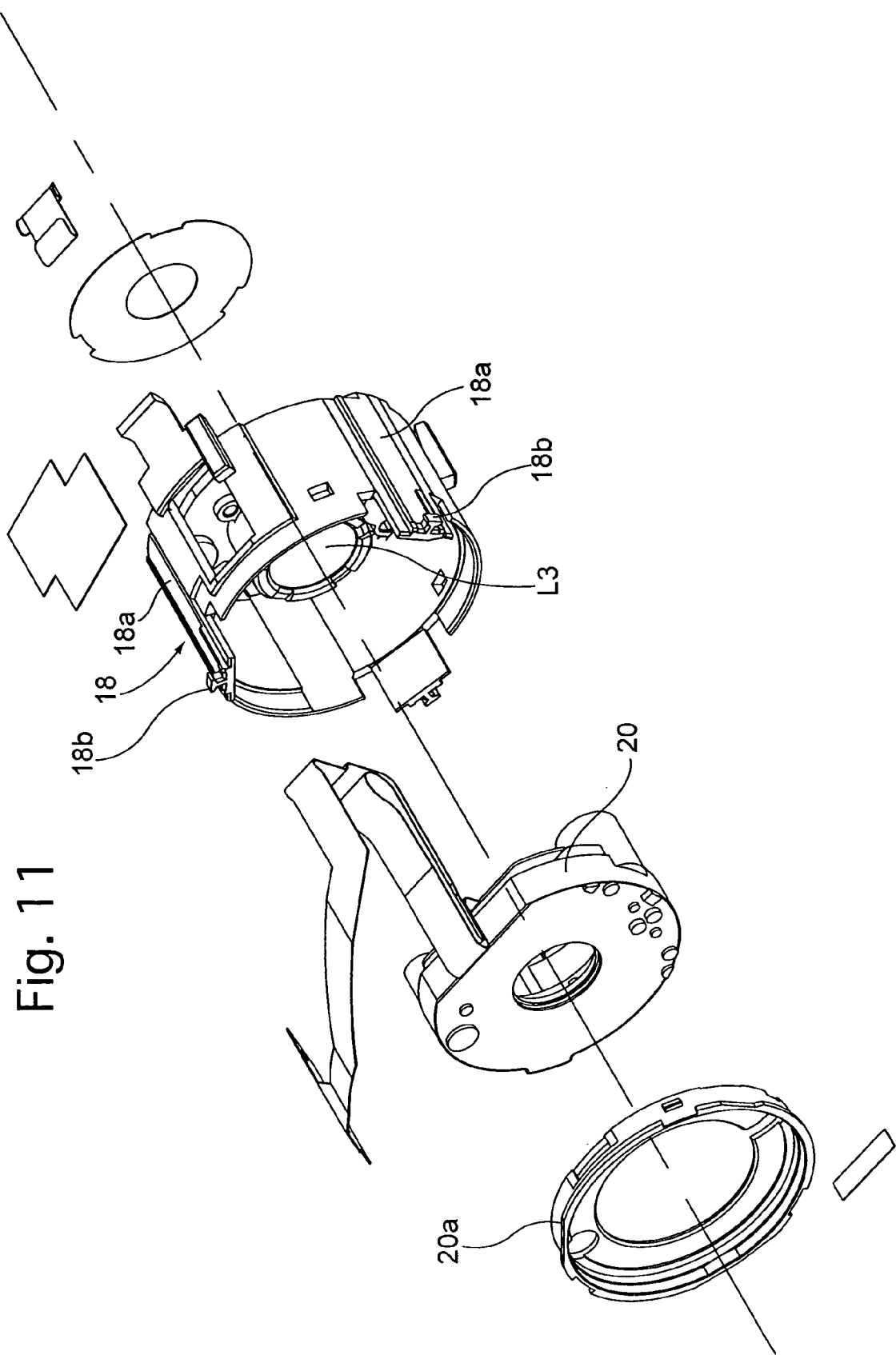
FIG. 11 is an exploded perspective view of a portion of the zoom lens barrel shown in FIG. 3, showing a third lens group moving ring and peripheral elements.

The zoom lens barrel 10 is provided inside the second lens group moving ring 17 with a third lens group moving ring (third lens frame) 18 which supports the third lens group L3. The third lens group moving ring 18 is provided on an outer peripheral surface thereof with a set of three linear guide projections 18a which are elongated in a direction parallel to the optical axis O to be engaged in the set of three linear guide slots 17a of the second lens group moving ring 17 to be freely slidable relative thereto along the optical axis O, respectively. The third lens group moving ring 18 is provided on a center of each linear guide projection 18a at the front end thereof with a linear moving key (stop projection) 18b (see FIGS. 11, 17 and 18) which has a substantially T-shaped cross section to be engaged in the associated hanging groove 15e. The three linear guide projections 15f, the three hanging groove 15e and the three linear moving keys 18b constitute a second linear guide mechanism. Furthermore, the three linear guide slots 17a and the three linear guide projections 18a constitute a third linear guide mechanism. As shown in FIG. 11, the zoom lens barrel 10 is provided with a shutter unit 20 which is inserted into the third lens group moving ring 18 to be positioned in front of the third lens group L3. The shutter unit 20 is fixed to the third lens group moving ring 18 by a fixing ring 20a. The zoom lens barrel 10 is provided between the third lens group moving ring 18 (the fixing ring 20a) and the second lens group moving ring 17 with a compression coil spring 21 which continuously biases the third lens group moving ring 18 rearwards relative to the second lens group moving ring 17. The rear limit of this rearward movement of the third lens group moving ring 18 relative to the second lens group moving ring 17 is determined by the three linear moving keys 18b contacting the closed rear ends of the three hanging grooves 15e, respectively. Namely, when the zoom lens barrel 10 is in a ready-to-photograph position, each linear moving key 18b remains in contact with the rear end of the associated hanging groove 15e of the first lens group moving ring 15 to keep the distance between the first lens group L1 and the third lens group L3 constant. When the zoom lens barrel 10 changes from a ready-to-photograph state to the retracted state shown in FIG. 3, a further rearward movement of the first lens group L1 in accordance with contours of the set of three first cam grooves C15, after the third lens group L3 (the third lens group moving ring 18) has reached the mechanical rear moving limit thereof, causes the first lens group L1 to approach the third lens group L3 while compressing the compression coil spring 21 (see FIG. 1). Each linear moving key 18b is formed so that the radially outer end thereof bulges to be prevented from coming off the associated hanging groove 15e.

Figure 12:
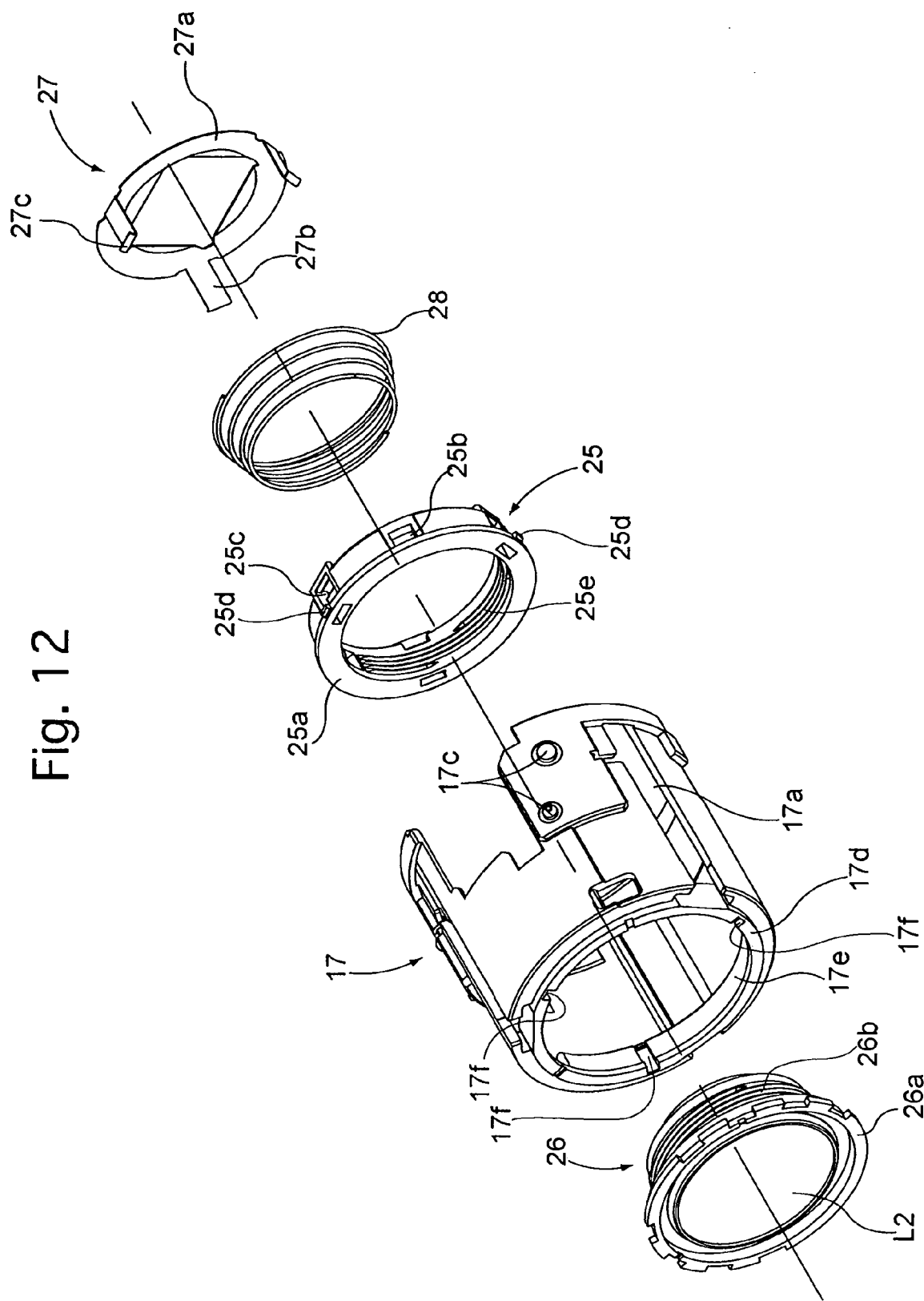
FIG. 12 is an exploded perspective view of a portion of the zoom lens barrel shown in FIG. 3, showing a second lens group moving ring and peripheral elements.
Figure 13:
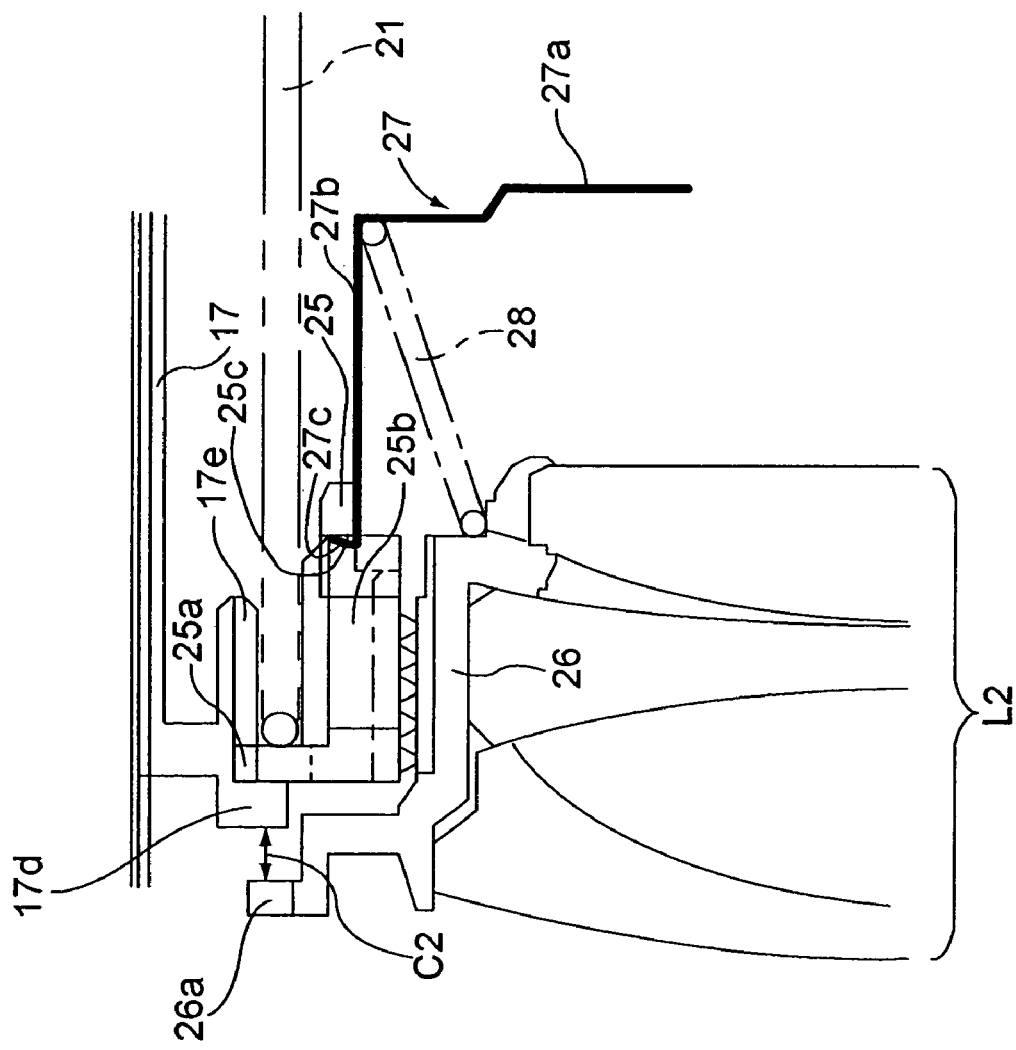
FIG. 13 is a longitudinal view of a portion of the zoom lens barrel shown in FIG. 3, showing a portion of the second lens group moving ring and peripheral elements.
Figure 14:
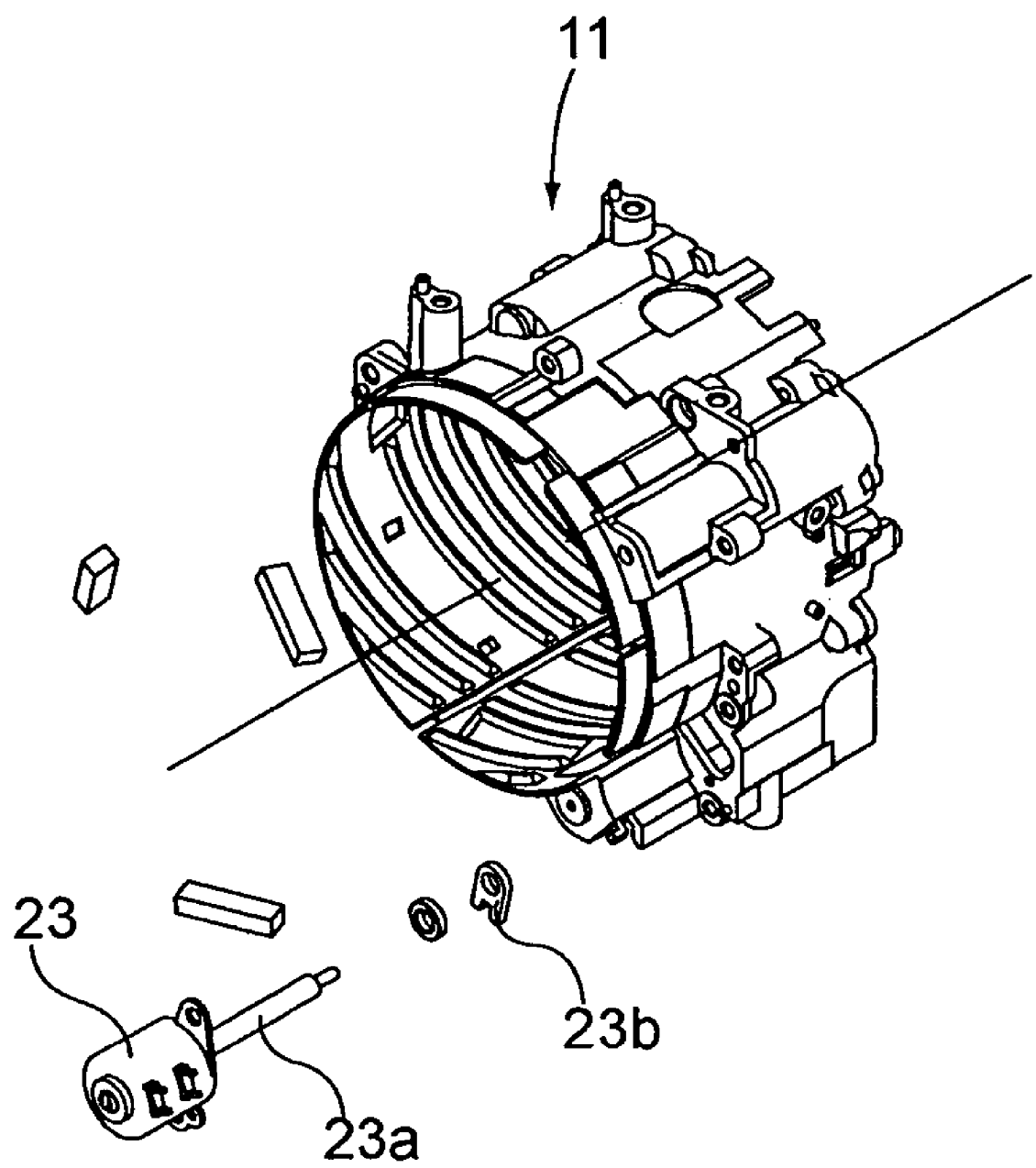
FIG. 14 is an exploded perspective view of a portion of the zoom lens barrel shown in FIG. 3, showing a stationary barrel, a pulse motor supported by the stationary barrel, and peripheral elements, seen from the rear side thereof.

Although a biasing force of the compression coil spring 21 can be applied directly to the second lens group moving ring 17 (i.e., although the second lens group L2 can be fixed to the second lens group moving ring 17), the second lens group L2 is made to be capable of moving rearward relative to the second lens group moving ring 17 for the purpose of further reduction in length of the zoom lens barrel 10 in the retracted state thereof in the present embodiment of the zoom lens barrel. FIGS. 12 and 13 show this structure for the further reduction in length of the zoom lens barrel 10. The second lens group moving ring 17 is provided at the front end thereof with a cylindrical portion 17e having an inner flange 17d. Three linear guide grooves 17f, which extend parallel to the optical axis direction and open at the front and rear ends thereof, are formed at equi-angular intervals on the cylindrical portion 17e. The zoom lens barrel 10 is provided inside the second lens group moving ring 17 with an intermediate ring 25. The intermediate ring 25 is provided at the front end thereof with a flange portion 25a which is fitted in the cylindrical portion 17e to be freely slidable on the cylindrical portion 17e in the optical axis direction. An end portion of the compression coil spring 21 abuts against the flange portion 25a, so that the flange portion 25a presses against the inner flange 17d due to the resiliency of the compression coil spring 21. Three guide projections 25d which radially extend outwards are provided on the outer peripheral surface of the flange portion 25a. The three guide projection 25d are respectively engaged with the three linear guide grooves 17f of the second lens group moving ring 17 from the rear side of the second lens group moving ring 17. Accordingly, the intermediate ring 25 is prevented from rotating about the optical axis with respect to the second lens group moving ring 17, and can only relatively move in the optical axis direction. The front face of the flange portion 25a can move forwards until sliding contact is made with the rear face of the inner flange 17d. The zoom lens barrel L2 is provided inside the second lens group moving ring 17 with a second lens group support frame 26 to which the second lens group L2 is fixed. A male thread 26b of the second lens group support frame 26 is screwed into female thread 25e formed on the inner periphery of the intermediate ring 25. Accordingly, the position of the second lens group L2 relative to the intermediate ring 25 which is prevented from rotating about the optical axis can be adjusted in the optical axis direction (zooming adjustment) by rotating the second lens group support frame 26 relative to the intermediate ring 25. After this adjustment, the second lens group support frame 26 can be permanently fixed to the intermediate ring 25 by putting drops of an adhesive agent into a radial through hole 25b formed on the intermediate ring 25. The second lens group support frame 26 is provided on an outer peripheral surface thereof with an outer flange 26a, and a clearance C2 (see FIG. 13) for the zooming adjustment exits between a front end surface of the inner flange 17d and the outer flange 26a. The compression coil spring 21 biases the intermediate ring 25 forward, and the intermediate ring 25 is held at a position where the flange portion 25a contacts with the inner flange 17d when the zoom lens barrel 10 is in a ready-to-photograph state. Namely, on the one hand, the position of the second lens group L2 is controlled by the set of six second cam grooves C17 when the zoom lens barrel 10 is in a ready-to-photograph state; on the other hand, the second lens group support frame 26 is pushed rearward mechanically by the rear end of the first lens group support frame 24 to thereby move the outer flange 26a of the second lens group support frame 26 rearward to a point where the outer flange 26a contacts with the inner flange 17d when the zoom lens barrel 10 is retracted to the retracted position thereof. This reduces the length of the zoom lens barrel 10 by a length corresponding to the clearance C2.

The zoom lens barrel 10 is provided immediately behind the intermediate ring 25 with a light shield ring 27 which is supported by the intermediate ring 25. As shown in FIG. 12, the light shield ring 27 is provided with a ring portion 27a and a set of three leg portions 27b which extend forward from the ring portion 27a at intervals of approximately 120 degrees. Each leg portion 27b is provided at the front end thereof with a hook portion 27c which is formed by bending the tip of the leg portion 27b radially outwards. The intermediate ring 25 is provided on an outer peripheral surface thereof with a set of three engaging holes 25c with which the hook portions 27c of the set of three leg portions 27b are engaged, respectively (see FIG. 12). The zoom lens barrel 10 is provided between the light shield ring 27 and the second lens group support frame 26 with a compression coil spring 28 having a substantially truncated conical shape which continuously biases the light shield ring 27 rearwards. When the zoom lens barrel 10 is retracted toward the retracted position, the light shield ring 27 approaches the second lens group support frame 26 while compressing the compression coil spring 28 after reaching the rear moving limit of the light shield ring 27. The lengths of the set of three engaging holes 25c in the optical axis direction are determined to allow the ring portion 27a to come into contact with the second lens group support frame 26.

The compression coil spring 28 also serves as a device for removing backlash between the intermediate ring 25 and the second lens group support frame 26 when the second lens group support frame 26 is rotated relative to the intermediate ring 25 for the aforementioned zooming adjustment. The zooming adjustment is performed by rotating the second lens group support frame 26 relative to the intermediate ring 25 to adjust the position of the second lens group L2 in the optical axis direction relative to the intermediate ring 25 while viewing the position of an object image. This zooming adjustment can be performed with precision with backlash between the intermediate ring 25 and the second lens group support frame 26 being removed by the compression coil spring 28.

The zoom lens barrel 10 is provided behind the third lens group moving ring 18 with a fourth lens group support frame 22 to which the fourth lens group L4 is fixed. As described above, the fourth lens group L4 is moved to make a slight focus adjustment to the vari-focal lens system to adjust a slight focal deviation thereof while the first through third lens groups L1, L2 and L3 are moved relative to one another to vary the focal length of the zoom lens system, and is also moved as a focusing lens group. The fourth lens group L4 is moved along the optical axis O by rotation of a pulse motor 23 (see FIGS. 5 and 14). The pulse motor 23 is provided with a rotary screw shaft 23a. A nut member 23b is screwed on the rotary screwshaft 23a to be prevented from rotating relative to the stationary barrel 11. The nut member 23b is continuously biased by an extension coil spring S in a direction to contact with a leg portion 22a which projects radially outwards from the fourth lens group support frame 22 (see FIGS. 5 and 15). The fourth lens group support frame 22 is prevented from rotating by guide bars 22b, which extend in direction parallel to the optical axis direction, which are slidably engaged with radial projecting followers 22c which extend radially outwards from the fourth lens group support frame 22 (see FIGS. 2 and 15). Accordingly, rotations of the pulse motor 23 forward and reverse cause the fourth lens group support frame 22 (the fourth lens group L4) to move forward and rearward along the optical axis O, respectively. Rotations of the pulse motor 23 are controlled in accordance with information on focal length and/or information on object distance.

Accordingly, in the above described embodiment of the zoom lens barrel, rotating the cam/helicoid ring 12 by rotation of the drive pinion 13 causes the first lens group moving ring 15, the exterior ring 16 and the second lens group moving ring 17 to move along the optical axis O in accordance with contours of the set of three first cam grooves C15, the set of three third cam grooves C16 and the set of six second cam grooves C17, respectively. When the first lens group moving ring 15 moves forward from the retracted position, firstly the three linear moving keys 18b contact the rear ends of the three hanging grooves 15e, respectively, and subsequently the third lens group moving ring 18 moves together with the first lens group moving ring 15 with the three linear moving key 18b remaining in contact with the rear ends of the three hanging grooves 15e, respectively. The position of the fourth lens group L4 is controlled by the pulse motor 23, whose rotations are controlled in accordance with information on focal length, to make a slight focus adjustment to the vari-focal lens system to adjust a slight focal deviation thereof. As a result, reference moving paths as shown in FIG. 1 for performing a zooming operation are obtained. Rotations of the pulse motor 23 are also controlled in accordance with information on object distance to perform a focusing operation.

In the present embodiment of the zoom lens barrel, the female helicoid 11a is formed on an inner peripheral surface of the stationary barrel 11, while the zoom lens barrel 10 is provided at the rear end of the stationary barrel 11 with a substantially disk-shaped CCD holder 33 (see FIG. 8) which holds a CCD image sensor (image pick-up device) 32. The CCD holder 33 is fixed to a rear end surface of the stationary barrel 11. The CCD holder 33 is provided on an outer peripheral edge thereof with cutout portions K1 and K2 via which a stopper projection 33a is formed. An edge of the cutout portion K1 of the stopper projection 33a serves as a stop edge 33b. The cam/helicoid ring 12, which serves as a gear/helicoid ring, is positioned inside the stationary barrel 11, and the cam/helicoid ring 12 is provided on an outer peripheral surface thereof an annular gear/helicoid rib (annular rib) 12e (see FIG. 20). The male helicoid 12a, which engages with the female helicoid 11a, is formed on the gear/helicoid rib 12e, while teeth of the spur gear 12b are formed on each thread 12a1 of the male helicoid 12a. The drive pinion 13 is engaged with the teeth of the spur gear 12b so that rotation of the drive pinion 13 at a fixed position causes the cam/helicoid ring 12 to move along the optical axis O.

The linear guide ring 14 is positioned between the stationary barrel 11 and the cam/helicoid ring 12, and the set of three linear guide projections 14a that project radially outwards from an outer peripheral surface of the linear guide ring 14 are respectively engaged in the set of three linear guide grooves 11b that are formed on an inner peripheral surface of the stationary barrel 11. In addition, the circumferential groove 12c (see FIGS. 3 and 4) is formed on an outer peripheral surface of the cam/helicoid ring 12 immediately in front of the gear/helicoid rib 12e, while the set of three bayonet lugs 14b that project from an inner peripheral surface of the linear guide ring 14 at the rear end thereof are engaged in the circumferential groove 12c. Due to this structure, the linear guide ring 14 moves together with the cam/helicoid ring 12 along the optical axis O without rotating.

The three cam followers 15a of the first lens group moving ring (moving ring) 15, which is positioned between the cam/helicoid ring 12 and the linear guide ring 14 and supports the first lens group (focal-length varying lens group) L1, are respectively engaged in the set of three first cam grooves C15 that are formed on an outer peripheral surface of the cam/helicoid ring 12, while the six cam followers 17c of the second lens group moving ring 17, which is positioned inside the cam/helicoid ring 12 and supports the second lens group (focal-length varying lens group) L2, are respectively engaged in the set of six second cam grooves C17 that are formed on an inner peripheral surface of the cam/helicoid ring 12. Additionally, the first lens group moving ring 15 is linearly guided along the optical axis O by the linear guide ring 14, while the second lens group moving ring 17 is linearly guided along the optical axis O by the inner ring portion 15Y of the first lens group moving ring 15.

The third lens group moving ring 18 that supports the third lens group (focal-length varying lens group) L3 is positioned inside the cam/helicoid ring 12 and behind the second lens group moving ring 17. The third lens group moving ring 18 is linearly guided along the optical axis O by the first lens group moving ring 15 and the second lens group moving ring 17, and is continuously biased rearward by the compression coil spring 21 which is positioned between the second lens group moving ring 17 and the third lens group moving ring 18. The rear moving limit of the third lens group moving ring 18 relative to the first lens group moving ring 15 is determined by a linear guide mechanism provided between the first lens group moving ring 15 and the third lens group moving ring 18 (i.e., by contact of the three linear moving keys 18b with the closed rear ends of the three hanging grooves 15e, respectively). Rotation of the cam/helicoid ring 12 causes the first lens group moving ring 15, the second lens group moving ring 17 and the third lens group moving ring 18 to move along the optical axis O to thereby move the first lens group L1, the second lens group L2 and the third lens group L3 along the optical axis O to perform a zooming operation.

Figure 20:
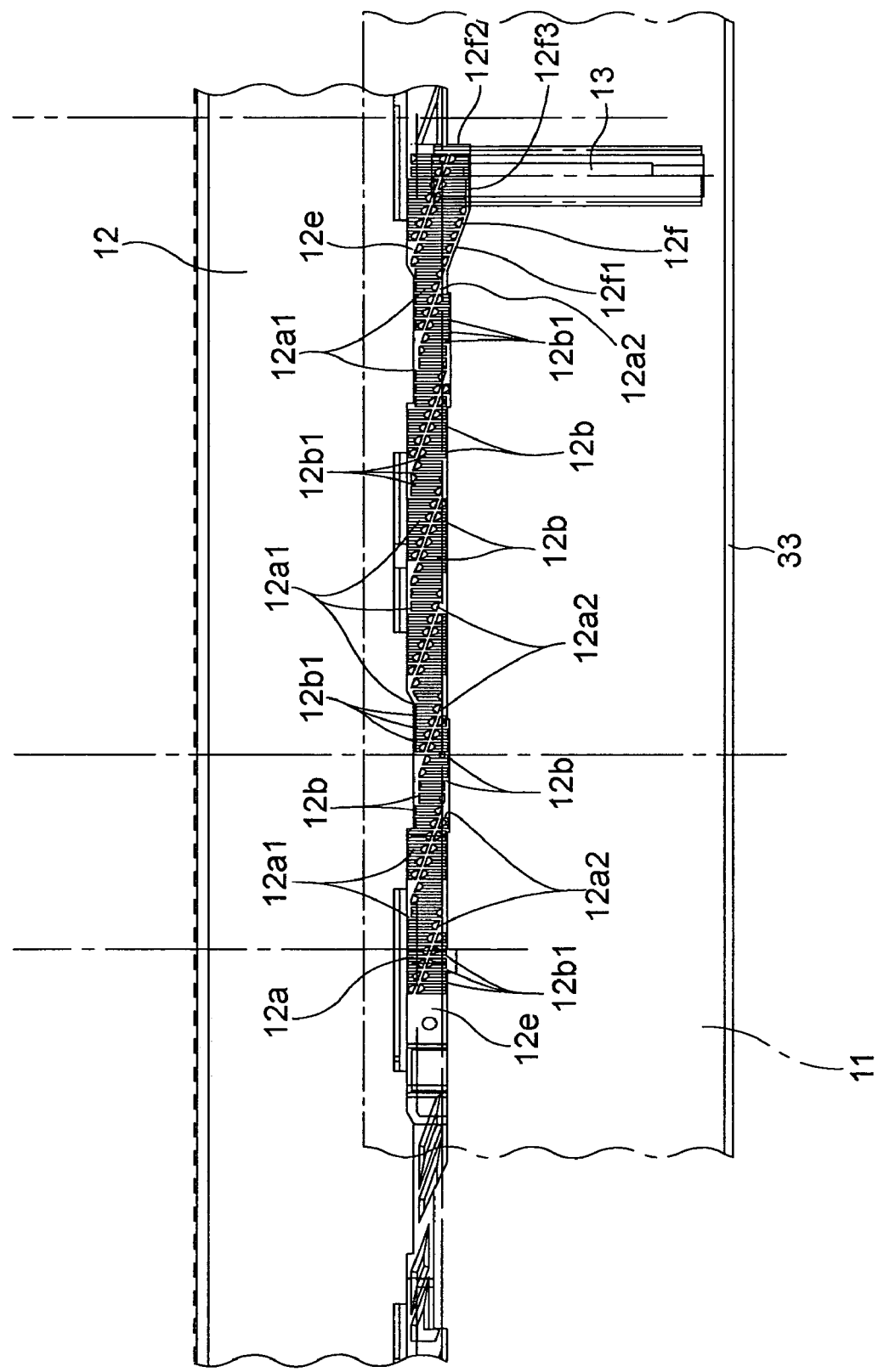
FIG. 20 is a developed view of the stationary barrel and the cam/helicoid ring in a ready-to-photograph state of the zoom lens barrel.

As shown in FIGS. 20 and 21, the gear/helicoid rib 12*e* is provided with a rear extension portion 12*f* which extends rearwards from a rear end of the gear/helicoid rib 12*e*. In other words, at least a portion of a rear end of the male helicoid 12*a*, on the threads 12*a*1 of which teeth of the spur gear 12*b* are formed, extends rearwards to serve as the rear extension portion 12*f*. The rear extension portion 12*f* is provided with an inclined surface 12*f*1, an axial surface (stop surface) 12*f*2 and a circumferential surface 12*f*3. The inclined surface 12*f*1 extends obliquely rewards along an extension of a specific root 12*a*2 among a plurality of roots 12*a*2 of the male helicoid 12*a*. The axial surface 12*f*2 extends parallel to each root 12*b*1 of the spur gear 12*b*, i.e., parallel to the optical axis O. The circumferential surface 12*f*3 is positioned between the inclined surface 12*f*1 and the axial surface 12*f*2, and extends parallel to a circumferential direction of the cam/helicoid ring 12.

When the cam/helicoid ring 12 retracts while rotating, the rear extension portion 12*f* enters the cutout portion K1 of the CCD holder 33 as shown in FIG. 21 so that the rear extension portion 12*f* overlaps the CCD holder 33 in the optical axis direction. At this stage, the cam/helicoid ring 12 stops retracting at a predetermined position (retreat stopping position) immediately before the axial surface 12*f*2 comes into contact with the stop edge 33*b* of the CCD holder 33 with control of the pulse motor 23 under normal conditions. The cam/helicoid ring 12 may continue to retract while rotating beyond the retreat stopping position in the case where a malfunction occurs in the pulse motor 23. Even if such abnormal overtravel of the cam/helicoid ring 12 occurs, the axial surface 12*f*2 quickly comes into contact with the stop edge 33*b* of the CCD holder 33 to be surely stopped thereby.

As can be understood from the above descriptions, in the present embodiment of the zoom lens barrel, the formation of the rear extension portion 12*f* on a portion of the gear/ helicoid rib 12*e* and the formation of teeth of the spur gear 12*b* on the rear extension portion 12*f* make the portion of the spur gear 12*b* greater than the remaining portion of the spur gear 12*b* in length in the optical axis direction (vertical direction as viewed in FIG. 20). This structure ensures the engagement between the spur gear 12*b* and the drive pinion 13, thus making it possible to perform a zooming operation with stability.

Furthermore, compared with the case wherein the rear extension portion 12*f* is not provided, since the length of the rear extension portion 12*f* in the optical axis direction provides a greater amount of engagement area between the drive pinion 13 and the spur gear 12*b*, the amount of rotation (and hence the amount of movement in the optical axis direction) of the cam/helicoid ring 12 increases. Accordingly, since the zoom lens barrel can be extended outwards by a larger amount during a photographing operation, it is possible to increase the zoom ratio of the zoom lens system. In addition, according to this construction, the length of the drive pinion 13 in the optical axis direction does not need to be increased, and hence, the camera body does not need to be enlarged in the optical axis direction.

Moreover, the length of the zoom lens barrel 10 is reduced to the extreme when the zoom lens barrel 10 is fully retracted as shown in FIG. 3 because the rear extension portion 12*f* enters the cutout portion K1 of the CCD holder 33. Furthermore, the axial surface 12*f*2 comes into contact with the stop edge 33*b* of the CCD holder 33 to be surely stopped thereby even in case of an abnormal overtravel of the cam/helicoid ring 12 occurs.

FIG. 22 shows another embodiment of the zoom lens barrel 10 in which a modification has been made to the cam/helicoid ring 12 and the CCD holder 33. In this embodiment, the cam/helicoid ring 12 is provided on an outer peripheral surface thereof a gear/helicoid rib (annular rib) 12*g* instead of the gear/helicoid rib 12*e* shown in FIG. 21. The length of the gear/helicoid rib 12*g* in the optical axis direction is greater than that of the gear/helicoid rib 12*e* shown in FIG. 21 in the optical axis direction. The gear/ helicoid rib 12*g* is provided immediately behind a rear side edge of each adjacent thread 12*a*1 of the male helicoid 12*a* with a cutout portion 12*g*1. Each cutout portion 12*g*1 is formed by an inclined surface 12*g*2, an axial surface (stop surface) 12*g*3 and a circumferential surface 12*g*4. The inclined surface 12*g*2 extends obliquely rewards along an extension of an adjacent root 12*a*2 formed between the adjacent threads 12*a*1 of the male helicoid 12*a*, which is formed on the gear/helicoid rib 12*g* in the modification of the cam/helicoid ring 12 shown in FIG. 22. The axial surface 12*g*3 extends on a rearward extension of one root 12*b* 1 of the spur gear 12*b*. The circumferential surface 12*g*4 is positioned between the inclined surface 12*g*2 and the axial surface 12*g*4, and extends in a circumferential direction of the cam/helicoid ring 12.

On the other hand, in the embodiment shown in FIG. 22, the CCD holder 33 is provided on an outer peripheral edge thereof with a stopper projection 33*d*. An edge (stop edge) 33*e*, which is one of two edges 33*e* and 33*f* provided on opposite edges of the stopper projection 33*d* with respect to the circumferential direction thereof, constitutes a stopper portion. The CCD holder 33 is further provided at regular intervals between the edges 33*e* and 33*f* of the stopper projection 33*d* of the CCD holder 33 with seven stop projections 33*c*, which are shorter than the stopper projection 33*d* in the circumferential direction. A recess K3 is formed between each adjacent stop projections 33*c* and between each of the edges 33*e* and 33*f* of the stopper projection 33*d* and an adjacent stop projection 33*c*. Accordingly, eight recesses K3 in total are formed between the edges 33*e* and 33*f* of the stopper projection 33*d* of the CCD holder 33.

When the cam/helicoid ring 12 shown in FIG. 22 retracts while rotating, each stop projection 33*c* of the CCD holder 33 enters the associated cutout portion 12*g*1 of the cam/ helicoid ring 12, while a rear extension portion 12*g*5, which is positioned between any two adjacent cutout portions 12*g*1 to extend rearwards from a rear end of the gear/helicoid rib 12*g*, enters the associated recess K3 as shown in FIG. 22. At this time, the cam/helicoid ring 12 stops retracting at a predetermined position (retreat stopping position) immediately before each axial surface (stop surface) 12*g*3 comes into contact with the associated stop projection 33*c* or the stop edge 33*e* of the CCD holder 33 with control of the pulse motor 23 under normal conditions. The cam/helicoid ring 12 may continue to retract while rotating beyond the retracted stopping position in the case of a malfunction occurring in the pulse motor 23. Even if abnormal overtravel of the cam/helicoid ring 12 occurs, each axial surface 12*g*3 promptly comes into contact with the associated stop projection 33*c* or the stop edge 33*e* of the CCD holder 33 to be surely stopped thereby.

As can be understood from the above description, in the embodiment of the zoom lens barrel shown in FIG. 22, the above described structure wherein the gear/helicoid rib 12*g* is greater than the gear/helicoid rib 12e in length in the optical axis direction further ensures the engagement between the spur gear 12b and the drive pinion 13, thus making it possible to perform a zooming operation with stability.

Moreover, the length of the zoom lens barrel 10 is reduced to a minimum when the zoom lens barrel 10 is fully retracted because each rear extension portion 12g5 enters the associated recess K3 of the CCD holder 33. Furthermore, each axial surface 12g3 comes into contact with the associated stop projection 33c or the stop edge 33e of the CCD holder 33 to be surely stopped thereby even in case of an abnormal overtravel of the cam/helicoid ring 12 occurs.

As can be understood from the foregoing, according to the present invention, a zoom lens barrel which incorporates a lens drive mechanism including a stationary barrel, a gear/helicoid ring and a drive pinion, wherein the lens drive mechanism has a structure making it possible to miniaturize the zoom lens barrel, specifically to achieve both a further reduction in axial length of the gear/helicoid ring and a stable zooming operation, is achieved.

Furthermore, compared with the case wherein the length (in the optical axis direction) of the gear/helicoid rib 12g is not increased, since the amount of rotation (and hence the amount of movement in the optical axis direction) of the cam/helicoid ring 12 can be increased, the zoom ratio of the zoom lens system can be increased without enlarging the camera body in the optical axis direction.

Although the illustrated embodiment is applied to a zoom lens barrel, the present invention can be applied to a lens barrel other than a zoom lens barrel.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel comprising:
   a holder which holds an image pick-up device;
   a stationary barrel which includes a female helicoid formed on an inner peripheral surface thereof;
   a gear/helicoid ring which includes an annular rib formed on outer peripheral surface of said gear/helicoid ring at a rear end thereof, a male helicoid formed on said annular rib and engaged with said female helicoid of said stationary barrel, and a spur gear, wherein teeth of said spur gear are formed on each thread of said male helicoid; and
   a driving pinion which is engaged with said spur gear;
   wherein a rotation of said gear/helicoid ring via rotation of said driving pinion causes a lens group to move along an optical axis,
   wherein at least a portion of a rear end of said male helicoid, on threads of which said teeth of said spur gear are formed, extends rearwards to serve as a rear extension portion, and
   wherein at least a portion of said rear extension portion overlaps said holder in an optical axis direction when said gear/helicoid ring firstly retracts while rotating, and subsequently stops retracting at a predetermined position.

2. The lens barrel according to claim 1, wherein one of opposite end surfaces of said rear extension portion in a circumferential direction of said gear/helicoid ring extends obliquely rearwards on an extension of a root between two adjacent threads of said male helicoid, and wherein the other of said opposite end surfaces of said rear extension portion extends parallel to said teeth of said spur gear.

3. The lens barrel according to claim 1, wherein a cutout portion is formed on said holder so that a surface of said rear extension portion comes into contact with one of opposite edges of said cut out portion of said holder in a circumferential direction of said holder in the case where said gear/helicoid ring accidentally retracts beyond said predetermined position.

4. The lens barrel according to claim 1, further comprising:
   a moving ring which supports said lens group and includes at least one cam follower,
   wherein at least one cam groove in which said cam follower is engaged is formed on said gear/helicoid ring.

5. The lens barrel according to claim 4, wherein said moving ring is linearly guided along said optical axis without rotating.

6. The lens barrel according to claim 1, wherein said holder is fixed to a rear end surface of said stationary barrel.

7. The lens barrel according to claim 1, wherein said driving pinion is elongated in a direction parallel to said optical axis.

8. The lens barrel according to claim 1, wherein said lens barrel comprises a zoom lens barrel; and
   wherein said lens group comprises a focal length varying lens group.

9. The lens barrel according to claim 1, further comprising:
   a linear guide ring provided around said gear/helicoid ring, and linearly guided along said optical axis without rotating, said linear guide ring guiding at least one lens group along said optical axis;
   a circumferential groove which is formed on an outer peripheral surface of said gear/helicoid ring adjacent to and in front of said annular rib; and
   a plurality of bayonet lugs which project from a rear end of said linear guide ring to be engaged in said circumferential groove so that said gear/helicoid ring and said linear guide ring move together in said optical axis direction while allowing said gear/helicoid ring to rotate freely relative to said linear guide ring.

10. The lens barrel according to claim 9, further comprising:
    a holder which holds an image pick-up device and includes a stop projection,
    wherein said rear moving limit of said gear/helicoid ring is determined by engagement of said stop projection with a stop surface which is formed on said annular rib in said cutout portion to extend along said root between two adjacent teeth of said spur gear.

11. The lens barrel according to claim 10, wherein a moving ring is linearly guided along said optical axis without rotating.

12. The lens barrel according to claim 9, further comprising:
    a moving ring which supports said lens group and includes at least one cam follower,
    wherein at least one cam groove in which said cam follower is engaged is formed on said gear/helicoid ring.

13. The lens barrel according to claim 9, wherein said holder is fixed to a rear end surface of said stationary barrel.

14. The lens barrel according to claim 9, wherein said pinion is elongated in a direction parallel to said optical axis.

15. The lens barrel according to claim 9, wherein said lens barrel comprises a zoom lens barrel; and
   wherein said lens group comprises a focal length varying lens group.

16. A lens barrel comprising:
   a stationary barrel which includes a female helicoid formed on an inner peripheral surface thereof;
   a gear/helicoid ring which includes an annular rib formed on an outer peripheral surface of said gear/helicoid ring at a rear end thereof, a male helicoid formed on said annular rib and engaged with said female helicoid of said stationary barrel, and a spur gear, wherein teeth of said spur gear are formed on each thread of said male helicoid;
   a pinion driven at a fixed position, and engaged with said spur gear;
   a linear guide ring provided around said gear/helicoid ring, and linearly guided along an optical axis without rotating;
   a circumferential groove which is formed on the outer peripheral surface of said gear/helicoid ring immediately in front of said annular rib; and
   a plurality of bayonet lugs which project from a rear end of said linear guide ring to be engaged in said circumferential groove so that said gear/helicoid ring and said linear guide ring move together in an optical axis direction while allowing said gear/helicoid ring to rotate freely relative to said linear guide ring, wherein a rotation of said gear/helicoid ring via rotation of said pinion causes at least one lens group, which is linearly guided along said optical axis via said linear guide ring, to move along said optical axis, wherein a cutout portion is formed on a rear end of said annular rib wherein a rear end of at least one thread of said male helicoid is cut out along both a root between two adjacent threads of said male helicoid and a root between two adjacent teeth of said spur gear, and wherein an element of said lens barrel enters said cutout portion when said gear/helicoid ring retracts to a rear moving limit thereof.

* * * * *